(12) United States Patent
Johnson et al.

(10) Patent No.: US 7,159,174 B2
(45) Date of Patent: Jan. 2, 2007

(54) DATA PREPARATION FOR MEDIA BROWSING

(75) Inventors: Bruce Alan Johnson, Woodinville, WA (US); W. Michael Anderson, Woodinville, WA (US); William David Sproule, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 10/317,527

(22) Filed: Dec. 12, 2002

(65) Prior Publication Data

US 2003/0151618 A1 Aug. 14, 2003

Related U.S. Application Data

(63) Continuation-in-part of application No. 10/050,771, filed on Jan. 16, 2002, now Pat. No. 7,069,510.

(51) Int. Cl.
G06F 3/00 (2006.01)
H04B 1/06 (2006.01)

(52) U.S. Cl. ................ 715/716; 715/760; 715/727; 715/978; 715/513; 715/512

(58) Field of Classification Search ............... 715/716, 715/760, 727, 978, 717, 748, 744, 747, 512, 715/513; 455/414.3, 414.4; 369/30.04, 369/30.08, 30.09

See application file for complete search history.

(56) References Cited

U.S. PATENT DOCUMENTS

| | | | |
|---|---|---|---|
| 5,519,410 A | 5/1996 | Smalanskas et al. | ........... 345/7 |
| 5,949,345 A | 9/1999 | Beckert et al. | ........ 340/815.41 |
| 6,009,363 A | 12/1999 | Beckert et al. | ............... 701/33 |

(Continued)

FOREIGN PATENT DOCUMENTS

WO WO 99/18518 * 4/1999

OTHER PUBLICATIONS

"Safe Access, Ignition and Convenience at the Driver's Fingertips", Siemens Automotive Corp., News Release, Sep. 1999, 3 pages.

(Continued)

*Primary Examiner*—Raymond J. Bayerl
(74) *Attorney, Agent, or Firm*—Lee & Hayes, PLLC

(57) ABSTRACT

A system is described which includes a content retriever to retrieve and format data and a media file playlist generated by the content retriever from the data. The media file playlist includes a playlist entry title identifying a title for a media file, a filename identifying the media file, and a metadata tag containing data for performing an action associated with the media file. The system also includes a text file playlist generated by the content retriever from the text data, formatted in XML (extensible markup language). The text file playlist includes text-to-speech markup tags identifying the XML-formatted text file as a text-to-speech conversion file, playlist name markup tags within the text-to-speech markup tags identifying a playlist type and a playlist title, entry title markup tags within the playlist name markup tags identifying a playlist entry title, text filename markup tags within the entry title markup tags identifying a text segment and a text filename for the text segment; and action markup tags within the entry title markup tags identifying data for performing an action associated with the text segment. The system further includes a text-to-speech converter configured to generate at least one audio file playlist from the text file playlist and a configuration module associated with the content retriever configured to accept user input instructions that identify the data.

26 Claims, 15 Drawing Sheets

U.S. PATENT DOCUMENTS

| | | | |
|---|---|---|---|
| 6,055,478 | A | 4/2000 | Heron .................... 701/213 |
| 6,115,686 | A * | 9/2000 | Chung et al. ........... 715/513 X |
| 6,198,996 | B1 | 3/2001 | Berstis .................... 701/36 |
| 6,201,540 | B1 | 3/2001 | Gallup et al. ............ 345/339 |
| 6,407,750 | B1 | 6/2002 | Gioscia et al. ........... 345/716 |
| 6,427,115 | B1 | 7/2002 | Sekiyama ............... 701/208 |
| 6,628,928 | B1 | 9/2003 | Crosby et al. ............ 455/77 |
| 6,725,022 | B1 | 4/2004 | Clayton et al. .......... 455/154.1 |
| 6,771,568 | B1 * | 8/2004 | Hochendoner ....... 369/30.08 X |
| 6,829,475 | B1 | 12/2004 | Lee et al. ................ 455/419 |
| 6,871,060 | B1 | 3/2005 | Strohmeier |
| 7,062,254 | B1 | 6/2006 | Hovestadt et al. ....... 455/412.1 |
| 2002/0002039 | A1 | 1/2002 | Quereshey et al. ......... 455/344 |
| 2002/0007379 | A1 * | 1/2002 | Wang et al. ............ 707/513 X |
| 2002/0081985 | A1 | 6/2002 | Liu et al. ................ 455/186.1 |
| 2002/0173273 | A1 * | 11/2002 | Spurgat et al. ............ 455/66 |
| 2004/0019396 | A1 * | 1/2004 | McMahon et al. ........... 700/94 |

OTHER PUBLICATIONS

"Automotive Application of Biometric Systems and Finger-print", Lichtermann and Pettit, Human Factors in 2000: Driving, Lighting, Seating Comfort, and Harmony in Vehicle Systems, SAE 2000 World Congress, Mar. 2000, pp. 1-8.

"The Implications of Engine Management Systems in Vehicle Security", Kershaw and Wright, IMechE, 1989, 8 pages.

"Voice Recognition Digital Cipher Lock for Smart Vehicles", 1993, IEEE, pp. 352-355.

"Custom Cars for Every Driver", Allison Wright, ComputerWorld, Mar. 2001, 1 page.

"HiQOS-BUS Multimedia Data Bus for In-Vehicle Information Systems", Sakai, J; Satoh, I.; Tomonoh, M.; Sakai, T.; Ibaraki, S.; Kurosaki, T.; Kitao, M.; Ikeda, T., Matsushita Technical Journal, vol. 44, No. 3, pp. 125-132, Jun. 1998 (Dialog search document-no English version available), 1 page.

"Development of a Road-Automobile Communication System (RACS)", Shibano, Y.; Ikeda, J.; Iwai, T.; Kanazaki, Y.; Okada, N.; Norikane, T.; Fujie, K.; Nishio, M.; Iwamoto, T.; Mori, T.; Ito, Y.; Oka, Y.; Sumitomo Electric Technical Review, No. 31, pp. 105-112, Jan. 1991.

"A New Car Radio with Recording and Playback Functions", Morihiro, Y.; Nishida, M.; Shiratani, Y., IEEE Trasactions on Consumer Electronics, vol. CE-32, No. 3, pp. 509-515, Aug. 1998.

"The Network Vehicle—A Glimpse into the Future of Mobile Multi-Media", Lind, R.; Schumacher, R.; Reger, R.; Olney, R.; Yen, H.; Laur, M.; Freeman, R., IEEE Aerospace and Electronic Systems Magazine, vol. 14, No. 9, pp. 27-32, Sep. 1999.

Car Radio with Traffic Monitor Feature, IBM Technical Disclosure Bulletin, UK Issue No. 449, p. 1531, Sep. 1, 2001.

"Integrating Face Recognition into Security Systems", Vetter, Zielke and von Seelen, Audio-and Video-Based Biometric Person Authentication. First Int'l Conference, 1997, pp. 439-449.

* cited by examiner

PC-BASED USER INTERFACE 214

CONTENT RETRIEVAL INFORMATION 300

| | | |
|---|---|---|
| Content Source: | Email Server | Source Number: 1 |
| Content Type: | Email | |
| Content Address: | www.abc.com/def/ghi.htm | Retrieve ? # Entries: All |

CONTENT SYNCHRONIZATION INFORMATION 302

Content Type: Email

Media Player Preset #: 1

```
<?xml version="1.0" encoding="utf-8" ?>
<ASX VERSION="3.0">
    <ENTRY>
        <Title>14 October 2002 News Clip</Title>    ⟵ 226
        <REF HREF="news1.mpeg" />                   ⟵ 228
    </ENTRY>
</ASX>
```

```
<?xml version="1.0" encoding="utf-8" ?>
<ASX VERSION="3.0">
    <ENTRY>
        <Title>Green Day: International Superhits</Title>   ⟵ 226
        <REF HREF="maria.wma" />                            ⟵ 228
        <Action>mailto:self "http://music.msn.com/Album/    ⟵ 230
?album=619137"</Action>
    </ENTRY>
</ASX>
```

```xml
<?xml version="1.0" encoding="utf-8" ?>
<TTS>
<TTSPlaylist Name="Calendar" Title="Outlook Calendar">
    <Entry Title="27 September 2002">
        <Text Filename="appt1.wma" Text="Good Morning Bruce, today is the twenty seventh of September." />
        <Action />
    </Entry>
        <Entry Title="9:30 32/1312">
            <Text Filename="appt2.wma" Text="At nine thirty this morning you organized a meeting in room thirty two thirteen twelve. Subject: outlook calendar patent. Mikky and Bill are attending." />
            <Action />
        </Entry>
        <Entry Title="11:00 18/3001">
            <Text Filename="appt3.wma" Text="At eleven this morning you have a meeting in room eighteen three oh oh one. Subject: quarterly review with Dick Brass." />
            <Action />
        </Entry>
</TTSPlaylist>
    <TTSPlaylist Name="Phone Tasks" Title="Outlook Phone tasks">
        <Entry Title="Call Mom re:Mark">
            <Text Filename="task1.wma" Text="Call mom regarding Mark's birthday." />
            <Action>603-555-6139</Action>
        </Entry>
        <Entry Title="Reschedule Dentist">
            <Text Filename="task1.wma" Text="Reschedule dentist appointment until November." />
            <Action>206-555-4321</Action>
        </Entry>
    </TTSPlaylist>
    <TTSPlaylist Name="MSN Music" Title="New Music from Green Day">
        <Entry Title="Green Day: International Superhits">
            <Text Filename="intro1.wma" Text="Check out Maria from Green Day on their new album International Superhits." />
            <Audio>maria.wma</Audio>
            <Action>mailto:self "http://music.msn.com/Album/?album=619137"</Action>
        </Entry>
    </TTSPlaylist>
</TTS>
```

Labels: 600 → `<TTS>`, 602 → `<TTSPlaylist ...>`, 604 → `<Entry ...>`, 606 → `<Text ...>`, 608 → `<Action ... >`

```
<?xml version="1.0" encoding="utf-8" ?>
<ASX VERSION="3.0">
    <ENTRY>
        <Title>27 September 2002</Title>      ← 226
        <REF HREF="appt1.wma" />              ← 232
    </ENTRY>
    <ENTRY>
        <Title>9:30 32/1312</Title>           ← 226
        <REF HREF="appt2.wma" />              ← 232
    </ENTRY>
    <ENTRY>
        <Title>11:00 18/3001</Title>          ← 226
        <REF HREF="appt3.wma" />              ← 232
    </ENTRY>
</ASX>
```

```
<?xml version="1.0" encoding="utf-8" ?>
<ASX VERSION="3.0">
    <ENTRY>
        <Title>Call Mom re:Mark</Title>       ← 226
        <REF HREF="task1.wma" />              ← 232
        <Action>603-555-6139</Action>         ← 230
    </ENTRY>
    <ENTRY>
        <Title>Reschedule Dentist</Title>     ← 226
        <REF HREF="task2.wma" />              ← 232
        <Action>206-555-4321</Action>         ← 230
    </ENTRY>
</ASX>
```

```
<?xml version="1.0" encoding="utf-8" ?>
<ASX VERSION="3.0">
    <ENTRY>
        <Title>Green Day: International Superhits</Title>   ←— 226
        <REF HREF="intro1.wma" />                            ←— 232
        <Action>mailto:self "http://music.msn.com/Album/     ←— 230
?album=619137"</Action>
    </ENTRY>
    <ENTRY>
        <Title>Green Day: International Superhits</Title>   ←— 226
        <REF HREF="maria.wma" />                             ←— 232
        <Action>mailto:self "http://music.msn.com/Album/     ←— 230
?album=619137"</Action>
    </ENTRY>
</ASX>
```

*Fig. 9*

DATA PREPARATION FOR MEDIA BROWSING

RELATED APPLICATIONS

This patent application is a continuation-in-part of U.S. patent application Ser. No. 10/050,771, which was filed on Jan. 16, 2002 and titled "In-Vehicle Audio Browser System Having a Common Usability Model" now U.S. Pat. No. 7,069,510, and which is hereby incorporated by reference.

TECHNICAL FIELD

The present disclosure generally relates to preparing commonly accessed data for presentation in a familiar format, and more particularly, to building media playlists from various media types and associating the playlists with a common user interface on a media player for playback in a pre-configured manner.

BACKGROUND

Many advances in the area of information technology attempt to provide an increasingly mobile society with improved access to the most up-to-date information possible. The range of such information is virtually limitless. For example, while taking a train to work and checking stock prices and the morning news on a wireless handheld computer, a father may want to check up on his child at a daycare center by accessing one of various monitoring cameras whose "real time" output is made available on the Internet by the daycare provider.

Although there is a wide range of information available, many consumers desire common information accessed on a regular basis from content sources that remain relatively constant. Much of this information is text-based. In addition, while the information desired may include some "real time" information (e.g., breaking news, traffic, live events), much of the desired information is "near time" information (e.g., emails, voicemails, daily appointments, regional events, general news, news magazines) or "any time" information (e.g., music, education, tourist). For example, a commuter's morning habits may include reading recent emails deposited overnight into an email inbox on a server at work, reading the top morning news stories from a particular online news source, listening to stories of interest from Web sites such as NPR (National Public Radio) that offer audio content online, and so on.

Depending on a user's circumstances, however, current methods for accessing and consuming such content can be problematic. Accessing and consuming the content can require significant visual interaction from a user, especially when the content is text-based. In many circumstances, such interaction is not practicable. For example, attempting to access and read email or other online content while driving an automobile to work presents various difficulties. Typically, a wireless link (e.g., through a cell phone) to a server needs to be established through which the content can be downloaded, for example, to a cell phone or handheld computer. The cell phone or handheld computer must then be manipulated to display desired content before the user can read it. Performing these tasks while operating an automobile may be quite difficult and even pose a significant safety hazard. Thus, accessing and consuming desired information, especially text-based content, can be difficult or impossible unless circumstances permit a user to devote significant attention to the endeavor.

Various services are available that attempt to alleviate some of these problems. For example, several Web services for cell phones provide online access via dial-up connections that permit users to navigate to desired text-based content which the service then translates into streaming audio content. Thus, by answering a series of questions posed by the service, a user might access an email server at work and navigate to desired text-based content, such as a daily task list. Typically, answers to the navigation questions can be provided by pressing appropriate keys on the cell phone key pad or by speaking into the phone. When the desired text content is identified (e.g., the first task in a task list), the service translates it into an audio stream for the user. The service then prompts the user to navigate to the next desired content (e.g., the next task in the list). Although translating text-based content into audio streams is helpful, such services nevertheless require significant user interaction to navigate to desired content. Navigating to the appropriate content can be a difficult, slow, and distracting process. In addition, accessing text content in this manner requires a continuous online connection via a cell phone, which can be difficult to maintain as well as costly.

Another service currently available for improving access to online content offers a way to synchronize pre-designated web pages with various devices such as PDA's, cell phones, and storage media. Thus, a device can be "docked" with a desktop PC, for example, and various web pages that are pre-designated by a user can be loaded onto, or synchronized with, the device. The user therefore has offline access to desired content without having to personally go online to retrieve the content. Although such services may reduce user interaction to retrieve online content, significant user interaction is still required to navigate within the synchronized content. In addition, because much of the web page content desired by consumers is text-based, such services do not address problems relating to the significant visual interaction required to consume such content. Such services therefore do little to improve access to most content under circumstances where a user cannot devote significant visual attention, such as while operating a motor vehicle.

Accordingly, the need exists for a way to prepare commonly accessed data for presentation in a familiar format that permits easy access and reduces the level of user interaction needed for such access.

SUMMARY

The disclosed systems and methods provide for acquiring commonly accessed information and presenting such information in a preconfigured format through a user interface that is common across various media players.

In the described implementation, a desktop personal computer (PC) includes a synchronization port for docking a media player and synchronizing content onto the media player. At some preset time while the media player is docked with the PC, media content is retrieved and prepared according to user instructions. The PC then loads the preconfigured media data onto the media player, thereby synchronizing the media player with an updated version of retrieved content.

The PC is configurable through a PC-based user interface to retrieve various media (e.g., text-based, audio, video, image) content from one or more content sources and to generate media playlists from the content. The playlists include media files such as audio, video, and image files that are downloaded to a media player for playback. Media playlists also include a playlist entry title for each media file in the playlist, a filename identifying each media file, and a metadata tag associated with each media file that may contain key text-based information useful in performing a specific function or action associated with the media file. Text-based content retrieved from a content source is formatted as an XML (extensible markup language) text file playlist and then included in a media playlist in audio format after conversion via a text-to-speech converter.

In addition to retrieving content and preparing media file playlists, the PC generates mapping information to associate playlists with particular preset buttons on a common user interface of the media player. The mapping information is based on instructions entered via the PC-based user interface and is downloaded along with playlists to the media player. The media player uses the mapping information to associate each playlist to a particular preset button. When a user selects a preset button on the media player, the media player plays the playlist associated with the preset button and displays each playlist entry title for each media file as it plays the media file. A media player further permits navigation of media files within each playlist and, depending on the media player's functionality, may perform a function or action associated with a current media file according to information stored in a metadata tag associated with the current media file. The media player thus provides convenient access to various groups of media content pre-configured into playlists and associated with common preset buttons on a media player.

In an implementation, a system is described which includes a content retriever to retrieve and format data and a media file playlist generated by the content retriever from the data. The media file playlist includes a playlist entry title identifying a title for a media file, a filename identifying the media file, and a metadata tag containing data for performing an action associated with the media file. The system also includes a text file playlist generated by the content retriever from the text data, formatted in XML (extensible markup language). The text file playlist includes text-to-speech markup tags identifying the XML-formatted text file as a text-to-speech conversion file, playlist name markup tags within the text-to-speech markup tags identifying a playlist type and a playlist title, entry title markup tags within the playlist name markup tags identifying a playlist entry title, text filename markup tags within the entry title markup tags identifying a text segment and a text filename for the text segment; and action markup tags within the entry title markup tags identifying data for performing an action associated with the text segment. The system further includes a text-to-speech converter configured to generate at least one audio file playlist from the text file playlist and a configuration module associated with the content retriever configured to accept user input instructions that identify the data.

BRIEF DESCRIPTION OF THE DRAWINGS

The same reference numerals are used throughout the drawings to reference like components and features.

FIG. 3 illustrates an example of a PC-based user interface.

FIGS. 4 and 5 illustrate examples of media file playlists.

FIG. 6 illustrates an example of an XML-formatted text file playlist.

FIGS. 7–9 illustrate examples of audio file playlists generated from the text file playlist of FIG. 6.

DETAILED DESCRIPTION

Overview

The following discussion is directed to a media browsing system that prepares various media content and synchronizes the content with a media player for playback. A user can specify the content and preconfigure the manner in which the content will be subsequently accessible through a common user interface on the media player. A variety of media players having configurable, common user interfaces promote a consistent media browsing experience across media players for users accessing a variety of preconfigured media content.

Exemplary Environment

Figure 1:
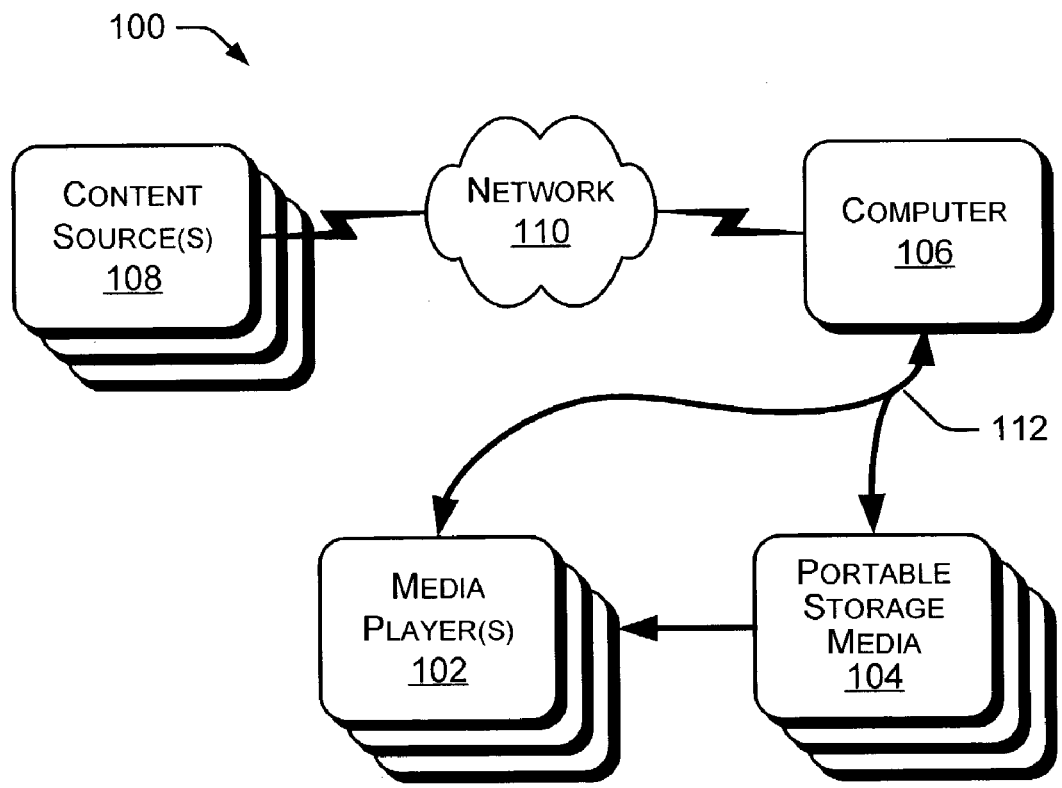
FIG. 1 illustrates an exemplary environment for implementing a media browsing system.

FIG. 1 shows an exemplary environment 100 suitable for implementing one or more embodiments of a media browsing system. The exemplary environment 100 can include various media players 102, portable storage media 104 for such media players, a computer 106, and one or more content sources 108. Computer 106 is operatively coupled through a network 110 to content source(s) 108. Network 110 can include both local and remote connections depending on the particular system configuration. Thus, network 110 may include, for example, any one or a combination of a modem, a cable modem, a LAN (local area network), a WAN (wide area network), an intranet, the Internet, or any other suitable communication link.

A media player 102 (or a portable storage medium 104 for a media player 102) is periodically synchronized with computer 106 through synchronization port 112. Certain media players 102 may also be connected to computer 106 for synchronization through a network using a wireless and/or modem/cellular-based Internet and VPN (virtual private network). Thus, physical docking is not necessary. The term "synchronization" as used throughout this disclosure is generally intended to indicate a process of loading preconfigured media data from computer 106 onto a media player 102 or onto a portable storage medium 104 for a media player 102. Such portable media 104 may include, for example, an SD (secure digital) card, a CF (compact flash) card, a PCMCIA (Personal Computer Memory Card International Association) flash card, a CF format hard disk drive, a PCMCIA format hard disk drive, a CD (compact disk), a floppy disc, and the like. Synchronization port 112 typically includes a docking cradle for a media player 102, but may also include a media port or media drive for the portable storage media 104 that may be employed by the media player 102.

Media player 102 can be any device with an audio and/or video subsystem capable of rendering digital media (audio/video) files such as mp3 (MPEG I Layer 1,2,3), .wav (Windows®) Wave), .wma (Windows® Media Audio 8), .wmv (Windows® Media Video), mpeg (Moving Picture Experts Group), .jpg, .gif, and the like. Media player 102 also includes a user-configurable common user interface (UI) as discussed below that may be implemented as graphical soft buttons on a touch sensitive screen or as hardware buttons. Thus, media player 102 may be generally implemented as, for example, a cell phone, a PDA (personal digital assistant; e.g., devices running Microsoft®'s PocketPC, Hewlett-Packard's Palmtop, 3Com's PalmPilot, etc.), a personal audio player (e.g., SONICblue's Rio 600 or Rio 800, Sony's Network Walkman), a car stereo, a home stereo, a DVD player, a VCR, and the like.

The media player 102 has controls that can be manipulated by a user to control the media player and/or to initiate media player functions. A control is generally a physical and/or visual object that can be selected by a user. Such controls are selected to initiate some action, and do not necessarily maintain an on or off state. In this sense, they often function similarly to a momentary contact electrical switch.

In some cases, the controls on a media player 102 might comprise so-called "preset" buttons. A preset button is a control whose function can be set by the user. An automotive-type radio, for example, has physical preset buttons that can be associated by the user with different radio stations. Frequently, preset buttons are identified by numerals, such as preset "1", preset "2", etc., and the function of a button does not change during operation of the device except when the function is deliberately changed by the user. In other cases, however, so-called "soft" buttons might be utilized. A soft button has functions that change depending on the operating context of the device. A particular soft button might be associated with multiple preset functions, or might function as a "preset" only in certain contexts. In most cases, a control's current functionality is displayed on a programmable display surface associated with the control. In the case of a touch-sensitive display device, the control will be implemented on the same programmable display surface.

Content source 108 is typically implemented as one or more server computers such as a Web server or email server. Thus, content source 108 may include a variety of general purpose computing devices such as a workstation computer, and may be configured in a manner similar to an exemplary implementation of computer 106 as described below with reference to FIG. 18. Content source 108 generally provides storage for electronic documents and information including various multi-media content that is accessible to client computers such as computer 106 over network 110.

Computer 106 generally retrieves and prepares media content for playback on computer 106 or another playback device such as a media player 102, and is otherwise typically capable of performing common computing functions, such as email, calendaring, task organization, word processing, Web browsing, and so on. In this embodiment, computer 106 runs an open platform operating system, such as the Windows® brand operating systems from Microsoft®. Computer 106 may be implemented, for example, as a desktop computer, a server computer, a laptop computer, or other form of personal computer (PC). One exemplary implementation of computer 106 is described in more detail below with reference to FIG. 18.

Computer 106 retrieves media content from one or more content sources 108, and, depending on the content type, it builds media file playlists and/or audio file playlists from the content according to a user's configuration instructions. The computer 106 supports a computer-based graphical user interface through which a user can specify desired media content (e.g., audio content, video content, text-based content, image content) for retrieval and preparation. Media and audio file playlists are generally prepared for playback on computer 106 or another playback device such as a media player 102. Media file playlists can include, for example, audio files, video files, and image files retrieved by computer 106. In this sense, a media file playlist may actually be a variety of playlist types, such as a video file playlist, an audio file playlist, and so on. Certain audio file playlists, however, are generated from content originally retrieved as text-based content that is subsequently converted to audio content. Therefore, such audio file playlists include audio files converted from text content, but do not include video files.

In addition to retrieving media content and generating media playlist files, computer 106 synchronizes (i.e., loads) content on a media player 102 with the playlist files and enables configuration of the media player's common user interface for playback of media content. Synchronization occurs periodically while the media player 102 (or its portable storage medium 104) is docked in synchronization port 112, or through a network using, for example, a wireless and/or modem/cellular-based Internet and VPN (virtual private network). The media player's common user interface is configured via a mapping file generated by computer 106. The mapping file is generated based on input entered through the computer-based user interface and is then loaded onto the media player 102 along with the media file playlists. The media player 102 uses the mapping file to associates each media file playlist with a particular preset button on the media player's common user interface. This mapping provides a user with ready access to various groups of media files (organized into playlists) through the selection of the different presets on the media player 102. As discussed in greater detail below, other controls on the media player 102 permit navigation of media files within each media file playlist, as well as providing control of the media player functions. A wide variety of media content, including text-based content that might otherwise be difficult to access under many circumstances, is thus made available to users in an easy-to-access media playlist format through the disclosed media browsing system and related methods.

Data Retrieval and Preparation

Figure 2:
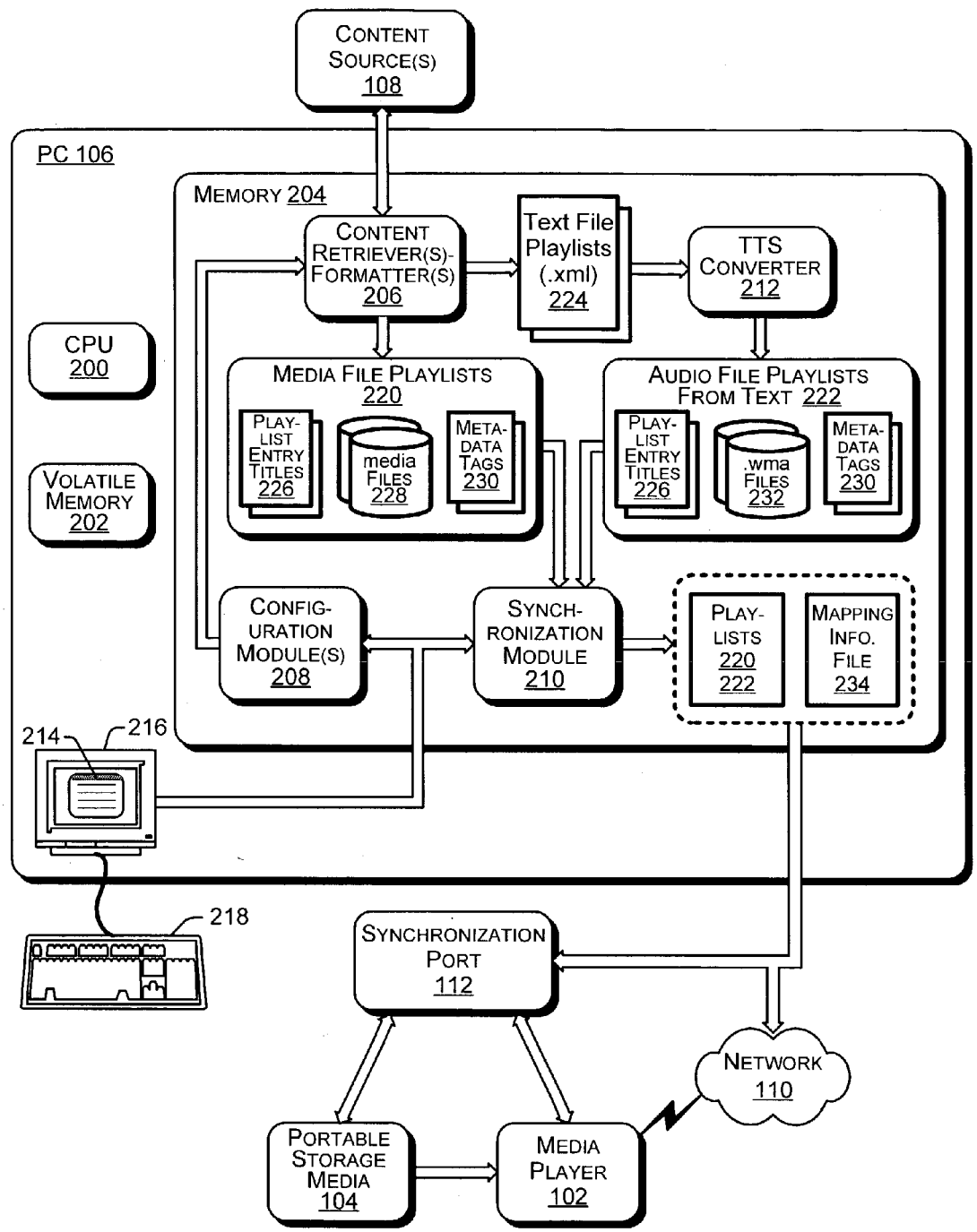
FIG. 2 is a block diagram of an exemplary hardware/software architecture of a personal computer.

FIG. 2 illustrates a hardware/software architecture that may be used in a computer 106 implemented as a desktop personal computer (PC) for retrieving, preparing, and synchronizing data in the exemplary environment 100 of FIG. 1. In general, PC 106 is configured through content configuration module(s) 208 to retrieve data using content retriever/formatter(s) 206 (hereinafter referred to as content retriever(s) 206) from various content source(s) 108 according to user instructions. Throughout this disclosure, the terms data and content are generally used interchangeably.

PC 106 includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for PC 106. One exemplary implementation of a PC 106 is described in more detail below with reference to FIG. 18. In the FIG. 2 implementation, content retriever(s) 206, content configuration module(s) 208, a synchronization module 210, and a text-to-speech converter 212 are stored in memory 204. These components are implemented in software as computer/processor-executable instructions that can be executed on processor 200.

Content retriever(s) 206 retrieve data based on user input instructions received from corresponding configuration module(s) 208. For each data/content type available from a content source 108, a corresponding content retriever 206 may be employed on PC 106. Each content retriever 206 is designed to understand the format and layout of the media content it is tasked with retrieving from a content source 108. For example, an NPR (National Public Radio) content retriever 206 may be designed to understand the layout and format of news stories (e.g., audio, video, text) on the NPR Web site news source 108. Therefore, when called on, the NPR content retriever 206 understands where and how to retrieve content from the NPR site specified by a user through a corresponding configuration module 208.

The number of content/data types on content sources 108 is virtually unlimited and may include, for example, calendar data, task data, contact data, email data, stock data, voice mail data, navigation data, news data, weather data, sports data, traffic data, real time instant message data, restaurant review data, movie listings data, trivia data, document data, user instructional data, and so on. Such data may be in various formats such as different text, audio and video formats. Accordingly, a PC 106 may include numerous content retrievers 206 to suit a user's needs for retrieving and formatting media content. Likewise, there is typically a different configuration module 208 associated with each content retriever 206.

Content configuration modules 208 support a PC-based user interface 214 as depicted on monitor 216 of PC 106. Through the PC-based user interface 214 and an input device such as keyboard 218, a user can specify desired data for retrieval from the various content sources(s) 108. FIG. 3 illustrates an example PC-based user interface 214 that might be displayed on monitor 216 through which a user could enter information for retrieving data from content sources 108. It is noted that the user interface 214 of FIG. 3 is provided by way of example only to illustrate possible content identification information that may be entered through such an interface 214. Thus, FIG. 3 is not intended to limit the extent or appearance of the user interface 214. The example user interface 214 enables a user to input content retrieval information 300 such as the name of each content source, a number for each content source, the type of content being retrieved, the address of the content, and the number of content entries to be retrieved at the specified address. Thus, configuration module(s) 208 can provide instruction to the content retrievers 206 as to what user-specified content to retrieve.

Data/content retrieval generally begins with one or more configuration modules 208 calling one or more corresponding content retrievers 206 to retrieve appropriate data. An example of a content retriever 206 gathering content would be a content retriever 206 that visits a major news-oriented Web site periodically (e.g., at some preset time while a media player 102 is docked in synchronization port 112) to retrieve a digest of news stories according to a user's specific desires.

The preparation of retrieved data involves building or generating playlists (220, 222) from the retrieved data. Media file playlists 220 generally include various types of playlists such as video file playlists, audio file playlists, audio/video file playlists, and so on. Media file playlists 220 include, for example, audio files and video files retrieved in their respective audio and video formats by computer 106.

Audio file playlists 222, however, are generated from content originally retrieved as text-based content which is then subsequently converted to audio content by TTS (text-to-speech) converter 212. Therefore, audio file playlists 222 include audio files that have been converted from text content. After text content is converted into audio files, playlists 220 and 222 have the same format. The format of playlists 220 and 222 provides a consistent media browsing and playback experience for a user regardless of the type of media player 102 being used.

In general, playlists 220 and 222 are customized lists of content that contain files (or point to files) specified by a user for playback on a media player 102. Organizing content by playlists enables the user to group various media content together to be played in any order specified by the user. For example, a user can define a playlist that includes a digest of stories from a news-oriented Web site, emails from an email inbox, appointments from a calendar, and so on.

Content retrievers 206 initially format retrieved data into media file playlists 220 and/or text file playlists 224. Text file playlists 224 are subsequently converted into audio file playlists 222 by TTS (text-to-speech) converter 212. Text file playlists 224 include mostly text-based content retrieved from content sources 108. Text file playlists 224 are formatted by content retrievers 206 in a markup language such as XML (extensible markup language). TTS converter 226 is configured to convert the XML-formatted text file playlists 224 into audio file playlists 222.

In general, XML (extensible markup language) is a flexible way to create common information formats and share both the format and the data on the World Wide Web, intranets, and elsewhere. For example, computer makers might agree on a standard way to describe information about a computer product (e.g., processor speed, memory size) and then describe the product information format using XML. The standard XML description enables an intelligent agent (a program) to visit each computer maker's Web site, gather data, and then make data comparisons. Thus, XML can be used to share information in a consistent way.

XML contains markup symbols that describe content in terms of the type of data being described. For example, the word "phonenum" placed within markup tags may indicate that the data that follows is a phone number. Therefore, an XML file can be processed purely as data by a program or it can be stored with similar data on another computer. It can also be displayed in a manner similar to an HTML (hypertext markup language) file. For example, depending on how an application in a receiving computer handles the phone number, the phone number could be stored, displayed, or dialed.

Media file playlists 220 and audio file playlists 222, like the text file playlists 224, are also formatted in an XML file format. Moreover, media file playlists 220 and audio file playlists 222 have the same general format as mentioned above. Thus, media file playlists 220 containing media information (including audio information, for example) have the same appearance as audio file playlists 222, the only difference being that the audio information in the audio file playlists 222 is initially retrieved as text-based data (and then converted to audio) rather than being retrieved as audio data.

FIGS. 4 and 5 represent examples of XML-formatted media file playlists 220. FIG. 4 represents a media file playlist 220 generated from audio/video content retrieved in an mpeg format from a content source 108. FIG. 5 represents a media file playlist 220 generated from audio content retrieved in a .wma format from a content source 108.

Content retrievers 206 generally format media file playlists 220 to include playlist entry titles 226 (set off by entry markup tags) identifying a title for a media file, a filename (set off by REF HREF markup tags) identifying the media file 228, and in some cases, a metadata tag 230 ("action" markup tags) containing data for performing an action associated with a media file 228. Thus, the media file playlist 220 of FIG. 4 includes a playlist entry title 226 identifying the title of a media file as "14, Oct. 2002 News Clip" and a filename 228 identifying the media file 228 as "news1.mpeg". There is no metadata tag associated with the media file of FIG. 4. FIG. 5 includes a playlist entry title 226 identifying the title of a media file as "Green Day: International Superhits", a filename 228 identifying the media file as "maria.wma", and a metadata tag 230 containing data for performing the action of mailing the user information about the media file. Although not specifically illustrated, it is noted that multiple actions can also be independently coded in an XML-formatted playlist. Thus, in the FIG. 5 example, various information about the media file along with the media file itself could all be mailed to the user.

FIG. 6 represents an example of an XML-formatted text file playlist 224 that may be generated by a content retriever 206 from text-based content. Content retrievers 206 are designed to understand the initial layout and format of text-based content they retrieve from content sources 108. Therefore, content retrievers 206 can retrieve the data needed to generate common XML-formatted text file playlists 224 such as that shown in FIG. 6. The common format of each XML-formatted text file playlist 224 enables TTS converter 212 to convert each XML-formatted text file playlist 224 into one or more audio file playlists 222. An example of a common format for an XML-formatted text file playlist 224 is shown in FIG. 6. The XML-formatted text file playlist 224 includes TTS markup tags 600 that identify the XML-formatted text file as a file that will undergo conversion by TTS converter 212. The XML-formatted text file playlist 224 also includes playlist name markup tags 602 located within the TTS markup tags 600 that identify a playlist type and a playlist title, entry title markup tags 604 located within the playlist name markup tags 602 that identify a playlist entry title, text filename markup tags 606 located within the entry title markup tags 604 that identify a text segment and a text filename for the text segment, and action markup tags 608 also located within the entry title markup tags 604 that may identify data for performing an action associated with the text segment.

Once text-based content is formatted into a text file playlist 224, TTS converter 212 converts appropriate text segments (within text filename markup tags 606 of FIG. 6) from the playlist 224 into audio files 232 (e.g., .wma files 232) used to generate audio file playlists 222 (FIG. 2). For example, each story from a digest of news stories may correspond with a separate text segment 606 in a text file playlist 224. In addition, TTS converter 212 locates other key text components within each text file playlist 224 and uses these components to configure a playlist entry title 226 and, where appropriate, a metadata tag 230 for each audio file 232 within an audio file playlist 222. Key text components in text file playlists 224 are generally dependent on the particular format of the initial text-based content. These components typically include identification information from text content such as the subject, date, time and location of a news story or a scheduled meeting. Key text components may also include information such as a phone number, that may be subsequently used in a metadata tag 230 by a media player 102 to automatically perform an available function of the media player 102, such as making a phone call if the media player 102 is embedded in a phone.

TTS converter 212 operates in a manner similar to a TTS engine that may be commonly available as part of an operating system. TTS engines recognize text and audiblize the text as spoken words using a synthesized voice chosen from several pre-generated voices. Although TTS engines are typically installed with an operating system such as the Windows® brand operating systems from Microsoft®, such engines are also available through third party manufacturers. TTS engines can provide different voices allowing for regional accents such as British English, or they can also speak a different language altogether such as German, French or Russian. In a manner similar to such TTS engines, TTS converter 212 recognizes text segments 606 within a text file playlist 224, converts the text segments into synthesized voice data, and stores the synthesized voice data as audio files 232. Thus, each text file playlist 224 is converted into one or more audio file playlists 222 by TTS converter 212.

FIGS. 7, 8, and 9 represent audio file playlists 222 generated by TTS converter 212 using the example XML-formatted text file playlist 224 shown in FIG. 6. As mentioned above, audio file playlists 222 are formatted like media file playlists 220. Therefore, the audio file playlists 222 of FIGS. 7, 8, and 9 look similar to the media file playlists 220 discussed above with reference to FIGS. 4 and 5. Like a media file playlist 220, each audio file playlist 222 includes playlist entry title markup tags 226 identifying a title for an audio file 232, a filename (set off by REF HREF markup tags) identifying the audio file 232, and in some cases, a metadata tag 230 (set off by "action" markup tags) containing data for performing an action associated with an audio file 232. Each playlist component in the audio file playlists of FIGS. 7, 8, and 9 corresponds with a playlist component from the XML-formatted text file playlist 224 shown in FIG. 6.

More specifically, FIG. 7 is an audio file playlist 222 of "Calendar" appointment playlist entries taken from the XML-formatted text file playlist 224 of FIG. 6. Therefore, the entry titles in the FIG. 7 audio file playlist 222 include "27 Sep. 2002", "9:30 32/1312", and "11:0018/3001". The filename references for these calendar entry titles are, respectively, "appt1.wma", "appt2.wma", and "appt3.wma". The filenames refer to audio files 232 containing text segments located in the text file playlist 224 of FIG. 6 that have been converted to audio via TTS converter 212. Thus, "appt1.wma" in FIG. 7 is an audio version of the text segment "Good Morning Bruce, today is the twenty seventh of September" from FIG. 6. Likewise, "appt2.wma" in FIG. 7 is an audio version of the text segment "At nine thirty this morning you organized a meeting in room thirty two thirteen twelve. Subject: outlook calendar patent. Mikky and Bill are attending" from FIG. 6, and "appt3.wma" is an audio version of the text segment "At eleven this morning you have a meeting in room eighteen three oh oh one. Subject: quarterly review with Dick Brass".

FIG. 8 is an audio file playlist 222 of "Phone Tasks" playlist entries taken from the XML-formatted text file playlist 224 of FIG. 6. The entry titles in the FIG. 8 audio file playlist 222 therefore include "Call Mom re:Mark" and "Reschedule Dentist". The filename references for the phone task entry titles are, respectively, "task1.wma" and "task2.wma". The filenames refer to audio files 232 containing text segments located in the text file playlist 224 of FIG. 6 that have been converted to audio via TTS converter 212. Thus, "task1.wma" in FIG. 8 is an audio version of the text segment "Call mom regarding Mark's birthday" from FIG. 6. Likewise, "task2.wma" in FIG. 8 is an audio version of the text segment "Reschedule dentist appointment until November" from FIG. 6. The audio file playlist 222 of FIG. 8 also includes action metadata tag entries 230 for each audio file 232. The action tags 230 contain data that can be used to perform the function of calling someone on the telephone to complete the tasks called out in the associated audio files (i.e., task1.wma, task2.wma). Use of the data in the action metadata tags 230 presumes that a media player playing the associated audio file has the appropriate functionality, such as a cell phone for example.

FIG. 9 is an audio file playlist 222 of "MSN Music" regarding new music from the group Green Day. The new music is a playlist entry in the audio file playlist 222 taken from the XML-formatted text file playlist 224 of FIG. 6. The entry title in the FIG. 9 audio file playlist 222 therefore includes "Green Day: International Superhits". The entry title is used twice in the audio file playlist 222 of FIG. 9 because the "MSN Music" playlist includes both a text segment and an original audio file. The filename references for the text segment and the audio file are, respectively, "intro1.wma" and "maria.wma". The filename "intro1.wma" refers to an audio file 232 version of the text segment, "Check out Maria from Green Day on their new album International Superhits" from the text file playlist 224 of FIG. 6 that has been converted to audio via TTS converter 212. The filename "maria.wma" refers to an audio file 232 that was retrieved in an audio format and not converted from text. The "MSN Music" playlist 222 of FIG. 9 also includes an action metadata tag entry 230 for both the "intro1.wma" and "maria.wma" audio filenames. The action tags 230 contain data that can be used to perform the function of mailing information about the audio files to the user. Use of the data in the action metadata tags 230 presumes that a media player playing the associated audio files has the appropriate functionality, such as a PDA for example.

Figure 10:
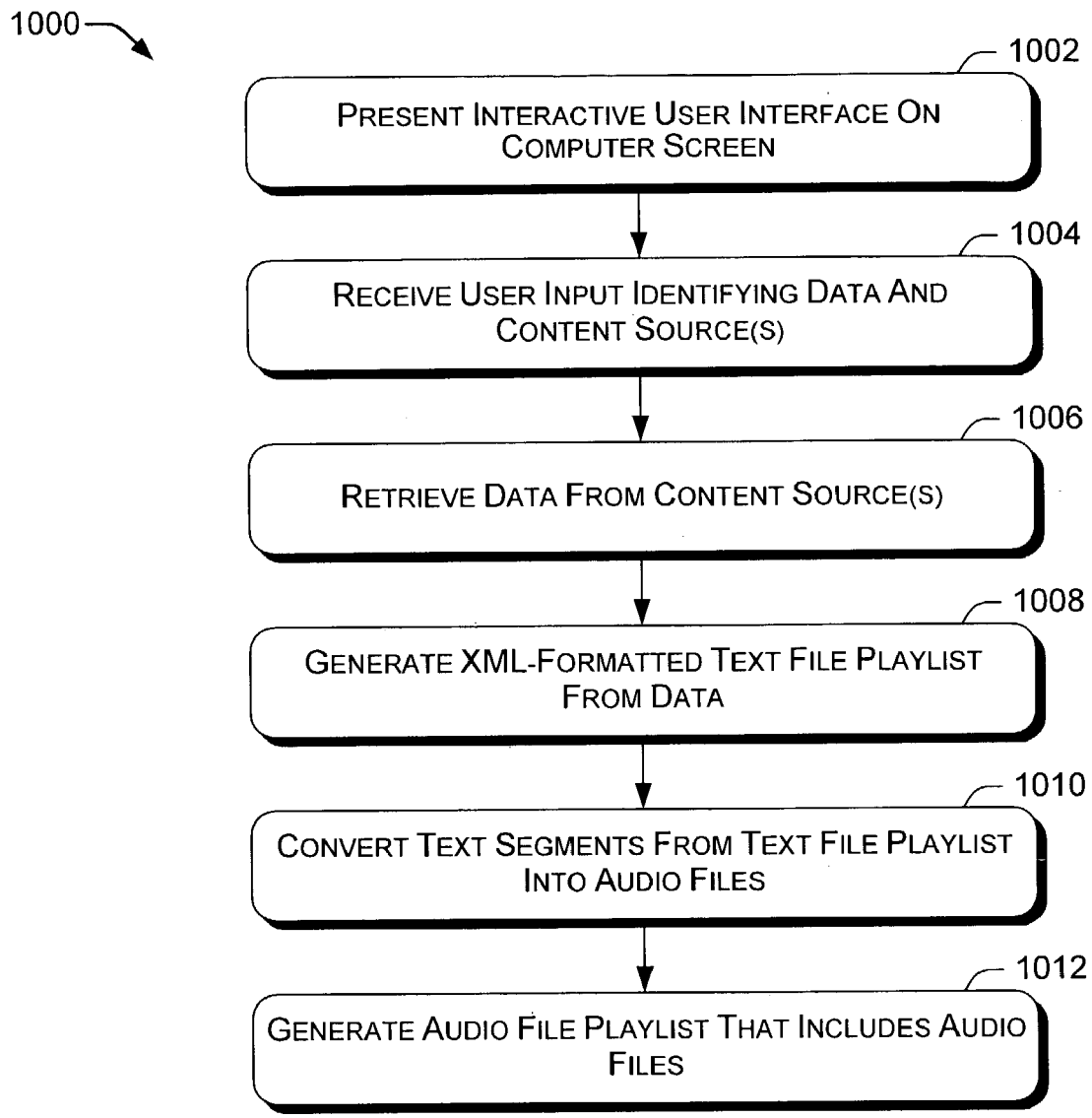
FIGS. 10 and 11 are flow diagrams illustrating methods for preparing data.
Figure 11:
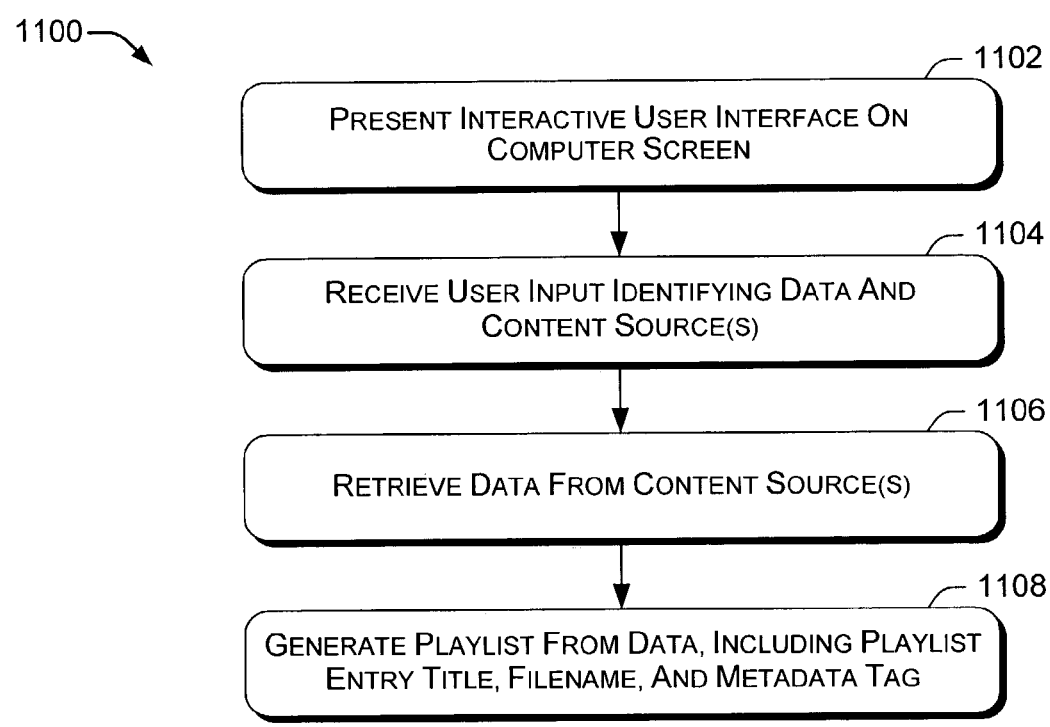

FIGS. 10 and 11 show exemplary methods 1000 and 1100 for preparing data in a system such as that described above with reference to FIGS. 1–9. The elements of the described methods may be performed by any appropriate means including, for example, by the execution of processor-readable instructions defined on a processor-readable media, such as a disk, a ROM or other such memory device. In addition, while the methods 1000 and 1100 are disclosed by means of flow diagrams and text associated with the blocks of the flow diagrams, it is to be understood that the blocks do not necessarily have to be performed in the order in which they are presented, and that an alternative order may result in similar advantages.

At block 1002 of method 1000, an interactive user interface (UI) is presented on a computer screen. The UI enables a user to enter information regarding desired media content to be retrieved from various content sources and how the media content will be subsequently accessible on a media player. The type and format of the media content specified can vary widely. For example, the data types can include calendar data, task data, contact data, email data, stock data, voice mail data, navigation data, news data, weather data, sports data, traffic data, real time instant message data, restaurant review data, movie listings data, trivia data, document data, user instructional data, and so on. The data can be in various formats such as different text, audio and video formats.

At block 1004, user information is received identifying the data to be retrieved and the content sources from which to retrieve the data. At block 1006, the specified data is retrieved from the content sources. Content retrievers that retrieve data generally understand the format and layout of the data they are retrieving, and are typically configured to retrieve one specific data type. At block 1008, an XML-formatted text file playlist is generated. The text file playlist is typically generated from text-based data, but it may also include and/or refer to data in other formats such as audio and video formats. The XML-formatted text file playlist includes TTS (text-to-speech) markup tags that identify the XML-formatted text file as a file that will undergo conversion by a TTS converter. The XML-formatted text file playlist also includes playlist name markup tags located within the TTS markup tags that identify a playlist type and a playlist title, entry title markup tags located within the playlist name markup tags that identify a playlist entry title, text filename markup tags located within the entry title markup tags that identify a text segment and a text filename for the text segment, and action markup tags also located within the entry title markup tags that may identify data for performing an action associated with the text segment.

At block 1010 of method 1000, text segments within the text file playlist are converted into audio files by the TTS converter. The TTS converter also generates audio file playlists as shown at block 1012. Audio file playlists include the audio files converted from text, as well as a title entry and filename for each audio file.

Method 1100 of FIG. 11 begins at block 1102, where an interactive user interface (UI) is presented on a computer screen. As in the previous method 1000, the UI enables a user to enter information regarding desired media content to be retrieved from various content sources and how the media content will be subsequently accessible on a media player. At block 1104, user information is received identifying the data to be retrieved and the content sources from which to retrieve the data, and at block 1106, the specified data is retrieved from the content sources. At block 1108, a playlist is generated from the data. The playlist may be of a variety of playlist types including, for example, an audio playlist, a video playlist, or an audio/video playlist. However, any audio file content within a playlist is retrieved in an audio format, unlike in the previous method where audio content is generated by converting text-based content.

Data Synchronization

In addition to retrieving and preparing data/content as discussed above, PC 106 of FIG. 2 is further configured to synchronize data onto a media player 102 for playback. Synchronization module 210 supports the PC-based user interface 214 on monitor 216 and enables a user to enter instructions (e.g., through an input device such as keyboard 218) that associate various playlists 220 and 222 with particular preset buttons on a media player 102. As discussed below, media players 102 generally have user interfaces whose controls are configurable such that a common user interface is available across various types of media players 102. The ability to preconfigure preset buttons on a common user interface across various media players 102 provides a familiar and consistent media playback experience for a user. A user can access various groups of media (organized into playlists 220 and 222) using the same preset buttons regardless of which media player 102 is used as a playback device.

The PC-based user interface 214 shown in FIG. 3 illustrates an example of the sort of content synchronization information 302 that a user might enter to configure preset buttons on a media player 102 for playing back desired content. As previously noted, FIG. 3 is not intended to limit the extent or appearance of the user interface 214, but is instead provided only by way of example. The content synchronization information 302 shown in FIG. 3 includes the content type and the preset number on the media player 102 that should be configured to play the content type. Thus, a user who has already entered content retrieval information 300 as discussed above, may also enter content synchronization information 302 that preconfigures preset buttons on a media player 102 for subsequent playback of the various content types (i.e., organized as playlists 220 and 222) being retrieved.

Synchronization module 210 receives the content synchronization information 302 through the PC-based user interface 214 and uses it to generate a mapping information file 234 (FIG. 2). Synchronization module 210 also receives media file playlists 220 from content retriever(s) 206 and/or audio file playlists 222 from TTS converter 212. The mapping file 234 contains associations between playlists 220 and 222 and specific preset controls on the common user interface of a media player 102. Synchronization module 210 synchronizes (i.e., downloads) both the mapping file 234 and playlists 220 and 222 onto the media player 102 or a portable storage medium 104 of the media player 102. The media player uses the mapping file 234 to associate preset buttons on its common user interface with particular playlists.

Synchronization module 210 initiates (e.g., through a configuration module 208) a content retrieval, preparation, and synchronization process upon sensing that a media player 102, or portable storage 104 for a media player 102, is docked with or otherwise connected (i.e., through network 110) for synchronization with the synchronization port 112. The content retrieval, preparation, and synchronization process may begin immediately or it may begin at some preconfigured time while a media player 102, or portable storage 104 for a media player 102, is docked with or otherwise connected to the synchronization port 112.

Figure 12:
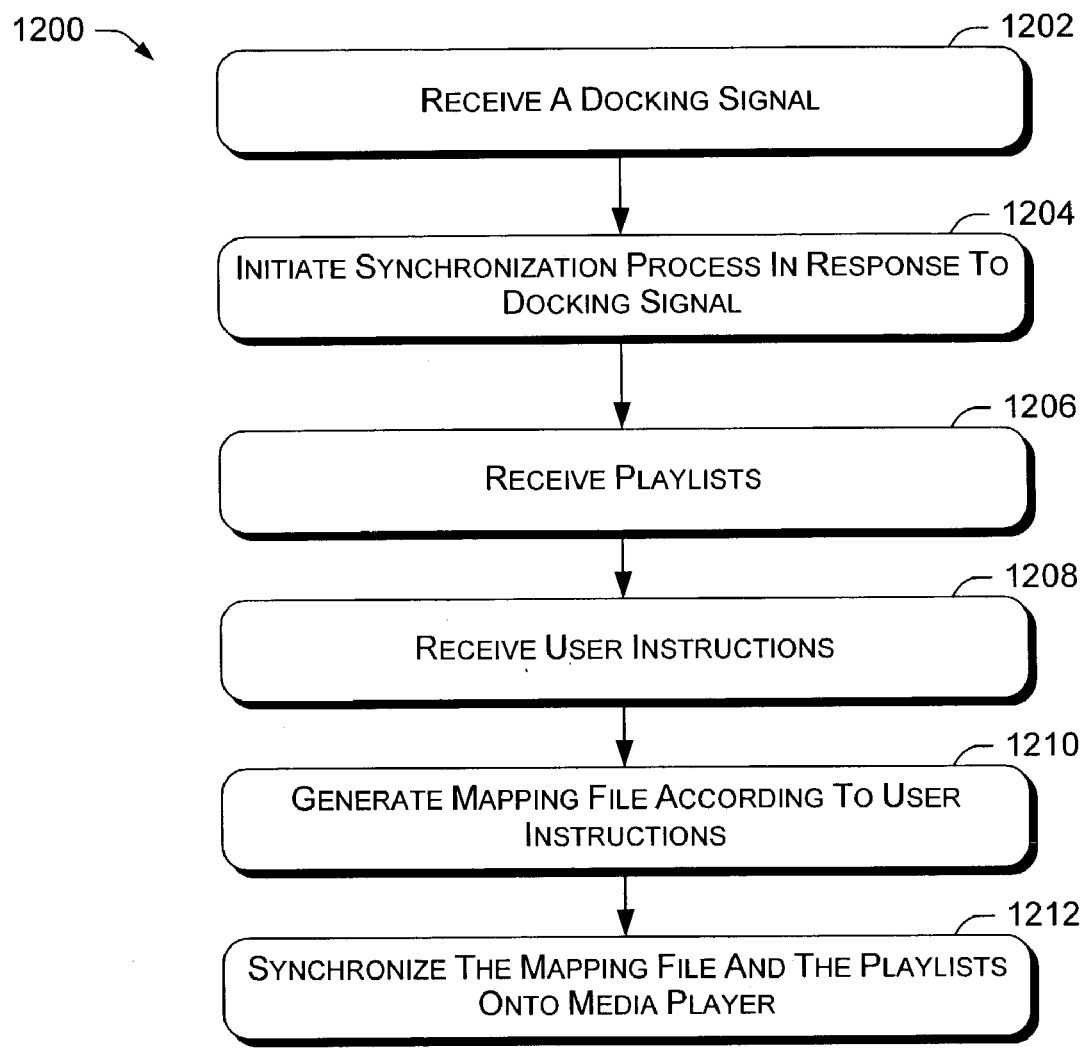
FIG. 12 is a flow diagram illustrating an exemplary method for synchronizing data with a media player.

FIG. 12 shows an exemplary method 1200 for synchronizing data with a media player 102 in a system such as that described above with reference to FIGS. 1–9. The elements of the described methods may be performed by any appropriate means including, for example, by the execution of processor-readable instructions defined on a processor-readable media, such as a disk, a ROM or other such memory device. In addition, while the method 1200 is disclosed by means of a flow diagram and text associated with the blocks of the flow diagram, it is to be understood that the blocks do not necessarily have to be performed in the order in which they are presented, and that an alternative order may result in similar advantages.

At block 1202 of method 1200, a docking signal is received. A docking signal is an indication that a media player has been linked with computer 106 in order to synchronize data. The link may be a physical docking of the media player in the synchronization port of computer 106, or it may be a connection made via a network. In response to the docking signal, a data synchronization process is initiated as indicated at block 1204. At block 1206 playlists are received. Playlists may be received from a content retriever 206 or a TTS converter 212 depending on the format of the data retrieved from content sources 108 as discussed above. At block 1208, user input instructions are received. Instructions are entered through a computer-based user input and they define a user's desires regarding how media content should be made accessible on a media player. The entry of instructions is not necessarily a part of a specific data synchronization process, as the entry of instructions may have occurred at some time prior to receiving a docking signal beginning such a process.

Continuing the method 1200, at block 1210, a mapping file is generated based on the user instructions. The mapping file defines associations between playlists and various preset buttons on the common user interface of a media player. Therefore, a playlist having a certain type of media content can be associated with a specific preset button on the common user interface of the media player. At block 1212, the mapping file and the playlists are synchronized onto the media player.

Audio Player with Common User Interface

Figure 13:
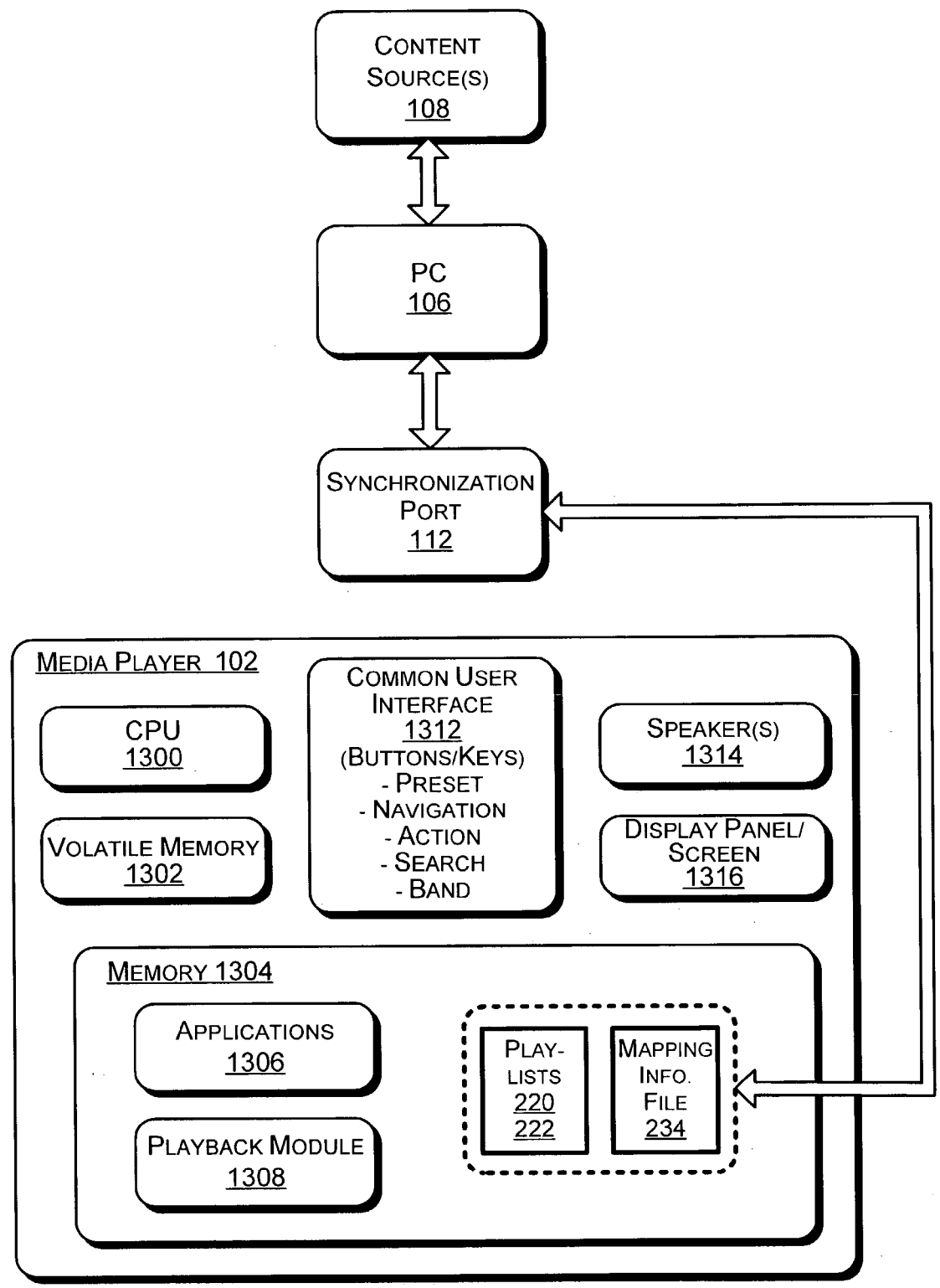
FIG. 13 is a block diagram illustrating a hardware/software architecture that may be used for implementing a variety of media players.

FIG. 13 is a block diagram illustrating a hardware/software architecture that may be used for implementing a variety of media players 102. A media player 102 includes a processor 1300, a volatile memory 1302 (i.e., RAM), and a nonvolatile memory 1304 that can be built-in and/or portable (e.g., ROM, hard disk, floppy disk, CD-ROM, CF card, SD card, etc.). Nonvolatile memory 1304 generally provides storage of computer/processor-readable instructions, data structures, program modules and other data for the media player 102. Depending on the types of additional functions that may be available on a particular media player 102 (e.g., cell phone functions, PDA functions), media player 102 may implement various application programs 1306 stored in memory 1304 and executable on processor 1300.

The media player 102 includes a common user interface 1312 having various control buttons, one or more speakers 1314, and, typically, a display panel or screen 1316. In general, the media player 102 associates or maps preset buttons (discussed below with respect to FIGS. 14–16) on the common user interface 1312 with playlists 220 and 222 using mapping file 234. Therefore, by selecting a particular preset, a user can access a preconfigured group of media files (e.g., 228, 232) that have been organized within a particular playlist from playlists 220 or 222.

The media player 102 has a playback module 1308 stored in memory 1304 that is configured to recognize and play media files (e.g., 228, 232) from playlists 220 and 222 according to the order of entries within the playlists, information in the mapping file 234, and user input from controls on the common user interface 1312. The display panel 1316 displays titles of media files from playlists 220 and 222 as the media player 102 plays the media files, and, as a user navigates through the titles of media files within the playlists 220 and 222 using various navigation control buttons on the common user interface 1312. Particular media players 102 may also include functionality (e.g., telephone capability) that enables an "action" button on the common user interface 1312 to initiate a function (e.g., dialing a telephone number) that uses information (e.g., a telephone number) from a metadata tag 230 associated with particular media file (228, 232).

The mapping file 234 received from PC 106 is represented in an XML manifest. The manifest contains exemplary information about the behavior and type for buttons on the common user interface 1312. The following is an example of the mapping information in an XML manifest:

```
<?xml version="1.0" encoding="utf-8"?>
<Manifest Version="0.5" ID="2452346234"
Name="MikkyA_Stuff">
    <Band ID="WM1" Title="WM1" Type="playlist"
CurrentPreset="2">
```

-continued

```
        <Preset ID="NPR-ME" Title="Morning
Edition" Setting="1" Src="Band0\Preset0\Preset0.ASX"
CurrentIndex=" " CurrentTime=" "/>
        <Preset ID="Market" Title="Market Place"
Setting="3" Src="Band0\Preset2\Preset2.ASX"
CurrentIndex=" " CurrentTime=" "/>
        <Preset ID="CBC-W@6" Title="CBC"
Setting="4" Src="Band0\Preset3\Preset3.ASX"
CurrentIndex=" " CurrentTime=" "/>
    </Band>
    <Band ID="WRK" Title="WRK" Type="playlist">
        <Preset ID="OutlookToday"
Title="OutlookToday" Setting="1"
Src="OutlookToday\OutlookToday.asx" CurrentIndex=" "
CurrentTime=" "/>
    </Band>
    <Band ID="PT" Title="Phone Tasks"
Type="phonetask">
        <Preset ID= "Phone Mail" Title="Phone
Mail" Setting="1" Src= "Phone\PhoneMail\PhoneMail.asx"
CurrentIndex=" " CurrentTime=" "/>
        <Preset ID="Home Tasks" Title="Home
Tasks" Setting="2"
Src="Phone\PhoneTaskshome\PhoneTaskshome.asx"
CurrentIndex=" " CurrentTime=" "/>
        <Preset ID="Work Tasks" Title="Work
Tasks" Setting="3"
Src="Phone\phonetaskswork\phonetaskswork.asx"
CurrentIndex=" " CurrentTime=" "/>
    </Band>
    <Band ID="NT1" Title="Navigation"
Type="direction">
        <Preset ID="To Airport" Title="To
Airport" Setting="1" Src="nav\toairport\toairport.asx"
CurrentIndex=" " CurrentTime=" "/>
        <Preset ID="To Gas Station" Title="To Gas
Station" Setting="2"
Src="nav\togasstation\togasstation.asx" CurrentIndex=" "
CurrentTime=" "/>
        <Preset ID="Top Museum of Flight"
Title="To Museum of Flight" Setting="3"
Src="Nav\tomuseumofflight\tomuseumofflight.asx"
CurrentIndex=" " CurrentTime=" "/>
    </Band>
    <Band ID="CL" Title="Contact List"
Type="contacts">
        Preset ID="Home" Title="Home Numbers"
Setting="1" Src="Contacts\Home.asx" CurrentIndex=" "
CurrentTime=" "/>
        Preset ID="Work" Title="Work Numbers"
Setting="2" Src="Contacts\Work.asx" CurrentIndex=" "
CurrentTime=" "/>
    </Band>
    <Band ID="FM" Title="FM" Type="radio"
CurrentPreset="1">
        <Preset ID="88.5" Title="KPLU 88.5"
Setting="1" Freq="FM:88.5"/>
        Preset ID="96.5" Title="KPNT 96.5"
Setting="2" Freq="FM:96.5"/>
    </Band>
  </Bands>
</Manifest>
```

The example manifest is one possible format that can be used to convey mapping information in mapping file 234 from a PC 106. With the flexibility of XML, this format can easily change to meet the needs of a common user interface 1312 that may encounter modifications in the future.

Media files from playlists 220 and 222 may be in various formats such as, for example, mp3 (MPEG I Layer 1,2,3), .wav (Windows® Wave), .wma (Windows® Media Audio 8), .wmv (Windows® Media Video), mpeg (Moving Picture Experts Group) and so on. Playback module 1308 recognizes the format of a media file and plays back the file through speakers 1314 and/or display screen 1316. For example module 1308 converts digital audio data from audio files (e.g., mp3, .wma) into analog sound waves (i.e., analog electric signals), which are amplified and converted into audible sound through speaker(s) 1314. It is noted that, although speaker(s) 1314 are shown in FIG. 13 as being an integral part of a media player 102, this is done for the purpose of illustration only and is not necessarily a requirement of a media player 102. Thus, speaker(s) 1314 may be, for example, separate components that are merely driven by a media player102.

As previously discussed, each media file (e.g., 228, 232) from playlists 220 and 222 has an associated title. Media players 102 having display panel/screens 1316 display the title for each media file as the media file is being played on the media player 102 and as a user navigates through media files within a playlist. Media files may also have associated action metadata tags 230 containing information useful in performing certain functions available on particular media players 102. For example, a media file (228, 232) representing a voice mail or a phone task may include a metadata tag 230 that contains the telephone number to the person who created the voice mail or phone task. If the media player 102 is a cell phone or some other device that includes telephone capability, the telephone number in the metadata tag 222 can be used for returning a telephone call to the person who created the voice mail or task. As discussed below, an action is initiated by selecting an "ACT" button on the common user interface 1312 of the media player 102.

User interface 1312 is made common across various media players 102 by virtue of its configurability using playlists (220, 222) and mapping file 234. The commonality of the user interface buttons 1312 across media players 102 promotes a consistent media experience for users through a simple transfer of portable storage media 104 from one media player 102 to another. For example, a user operating a car stereo media player 102 can continue playing media content from stored on a CF card 104 by transferring the card from the car stereo media player 102 to a PDA media player 102. Media content is associated with, or mapped to, the common user interface buttons 1312 on both media players 102 in a consistent manner by virtue of the preconfigured playlists (220, 222) and mapping file 234.

Figure 14:
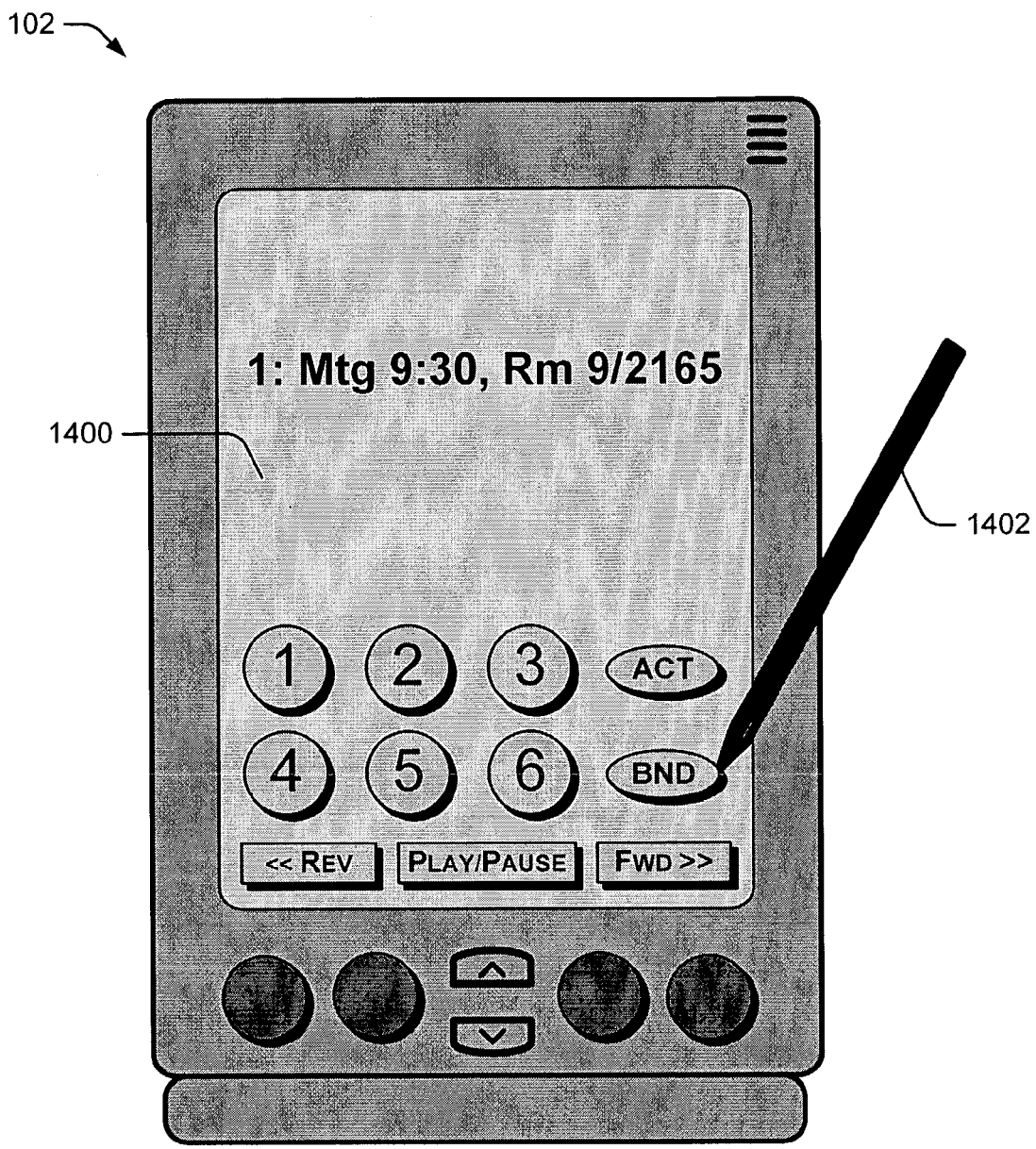
FIG. 14 illustrates an example of a media player in the form of a PDA.
Figure 15:
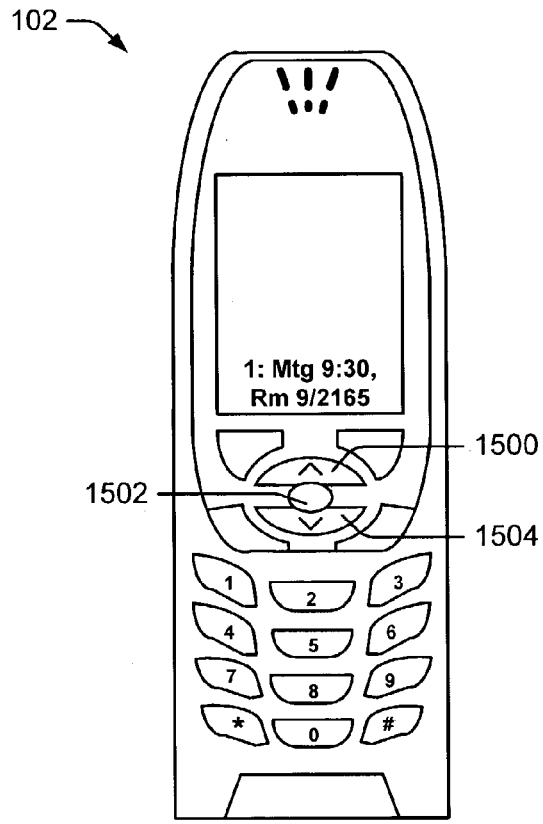
FIG. 15 illustrates an example of a media player in the form of a mobile phone.
Figure 16:
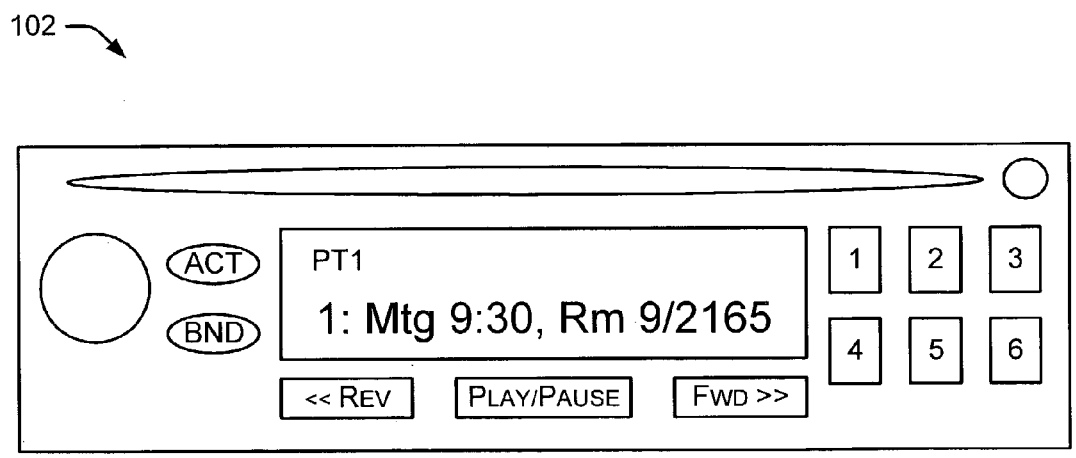
FIG. 16 illustrates an example of a media player in the form of an in-dash automobile entertainment unit.

FIGS. 14–16 show representative media players 102 in the form of a PDA (FIG. 14), a mobile phone (FIG. 15), and an in-dash automobile entertainment unit (FIG. 16). All three types of devices employ the common user interface 1312 of a media player 102. The common UI 1312 includes one or more preset buttons (e.g., buttons 1–6), one or more navigation buttons, an action button, and, optionally, a source button and a band button.

The navigation buttons include a "Rev" button that represents a reverse (or rewind) function, a "Play/Pause" button that toggles operation between play and pause functions, and a "Fwd" button that represent a forward (or advance) function.

An "ACT" button represents an "action" function. During playback of a media file (228, 232) that has an associated action metadata tag 230, a user can select the "ACT" button to have the media player 102 perform the action. Performance of an action presumes that the media player 102 is capable of performing such an action. For example, an action that calls for returning a telephone call to a phone number identified in an associated metadata tag 230 can be performed by a media player 102 implemented as a cell phone. However, the action of returning a telephone call may not be able to be performed by a media player 102 implemented as a car stereo system.

Optional "SRC" and "BND" buttons represent, respectively, a "source" function and a "band" function. Depending on the media player 102, the "BND" button may cause the media player 102, for example, to cycle through groups of playlists or to cycle through various bands supported by the media player 102. Thus, in one embodiment, such as where a media player 102 is implemented in a car stereo system (see FIG. 17), the BND button may switch the device through a number of bands such as AM, FM, CD (Audio CD), WM (Windows Media), PT (Phone Tasks), NT (Navigation Tasks), and CL (Contact Lists). A selected band identifies the current function of the media player 102, such as the playing of media files in a playlist 220 or 222 containing phone tasks or directions on how to navigate to a particular destination.

As mentioned above, the common user interface 1312 on a media player 102 may include soft buttons implemented on a touch sensitive screen or physical hard buttons already present on the device whose functions are configurable or programmable. FIG. 14 represents a media player 102 implemented in a PDA, wherein the common user interface 1312 is generated as soft buttons on a touch sensitive screen 1400. The soft buttons are selectable by pressing a stylus 1402 to the touch sensitive screen 1400. In general, the buttons on any media player 102 provide the same functionality. However, the "ACT" (action) button on various media players 102 may or may not provide particular functionality depending on the inherent capabilities of the particular device. For the PDA-implemented media player 102 of FIG. 14, the buttons on the common user interface 1312 typically perform the following functions:

| | |
|---|---|
| 1–6 Presets: | Press: Switches to a preset playlist 220, 222. |
| Reverse: | Press: Skips to previous media file in the current playlist 220, 222. Display is changed to previous title description of the media file. |
| | Press & Hold: Skips to first media file in the current playlist 220, 222. Display is changed to first title description of the media file. |
| Forward: | Press: Skips to next media file in the current playlist 220, 222. Display is changed to next title description of the media file. |
| | Press & Hold: Skips to last media file in the current playlist 220, 222. Display is changed to last title description of the media file. |
| Play/Pause: | Pauses or plays the current media file in the current playlist 220, 222. |
| Action: | Currently, there is no function. |

FIG. 15 represents an media player 102 implemented in a cell phone, wherein cell phone buttons are configured or programmed to represent the common user interface 1312 buttons. For example, the 6 presets are likely to be represented by the cell phone numbers 1–6, while the navigation buttons "Fwd", "Play/Pause", and "Rev", are likely to be represented by buttons 1500, 1502, and 1504, respectively. For the cell phone-implemented media player 102 of FIG. 15, the buttons on the common user interface 1312 typically perform the following functions:

| | |
|---|---|
| 1–6 Presets: | Press: Switches to a preset playlist 220, 222. |
| Reverse: | Press: Skips to previous media file in the current playlist 220, 222. Display is changed to previous title description of the media file. |
| | Press & Hold: Skips to first media file in the current playlist 220, 222. Display is changed to first title description of the media file. |
| Forward: | Press: Skips to next media file in the current playlist 220, 222. Display is changed to next title description of the media file. |
| | Press & Hold: Skips to last media file in the current playlist 220, 222. Display is changed to last title description of the media file. |
| Play/Pause: | Pauses or plays the current media file in the current playlist 220, 222. |
| Action: | Dials the phone number from a metadata tag 222 associated with the current media file. Interrupts the primary media output while the call is being made and resumes once it is completeted. If a call was in progress, then the phone is hung up. |
| | Press & Hold: Marks the action as completed. |

FIG. 16 represents a media player 102 implemented in a car stereo system, where most of the common user interface buttons 1312 are buttons that are familiar to a car stereo. For example, the 6 presets are a common feature of most car stereos, and are generally used in selecting preset radio stations. The navigation buttons, "Fwd", "Play/Pause", and "Rev", are commonly found on a car stereo system to control navigation of a CD in a CD player mode or an audio tape in a tape player mode. Thus, in addition to commonly understood functions of a car stereo system controlled by the user interface buttons 1312, these buttons additionally typically perform the following functions of the media player 102 implemented in the car stereo system:

| | |
|---|---|
| 1–6 Presets: | Press: Switches to a preset playlist 220, 222. |
| Reverse: | Press: Skips to previous media file in the current playlist 220, 222. Display is changed to previous title description of the media file. |
| | Press & Hold: Skips to first media file in the current playlist 220, 222. Display is changed to first title description of the media file. |
| Forward: | Press: Skips to next media file in the current playlist 220, 222. Display is changed to next title description of the media file. |
| | Press & Hold: Skips to last media file in the current playlist 220, 222. Display is changed to last title description of the media file. |
| Play/Pause: | Pauses or plays the current media file in the current playlist 220, 222. |
| Action: | Currently, there is no function. |

Figure 17:
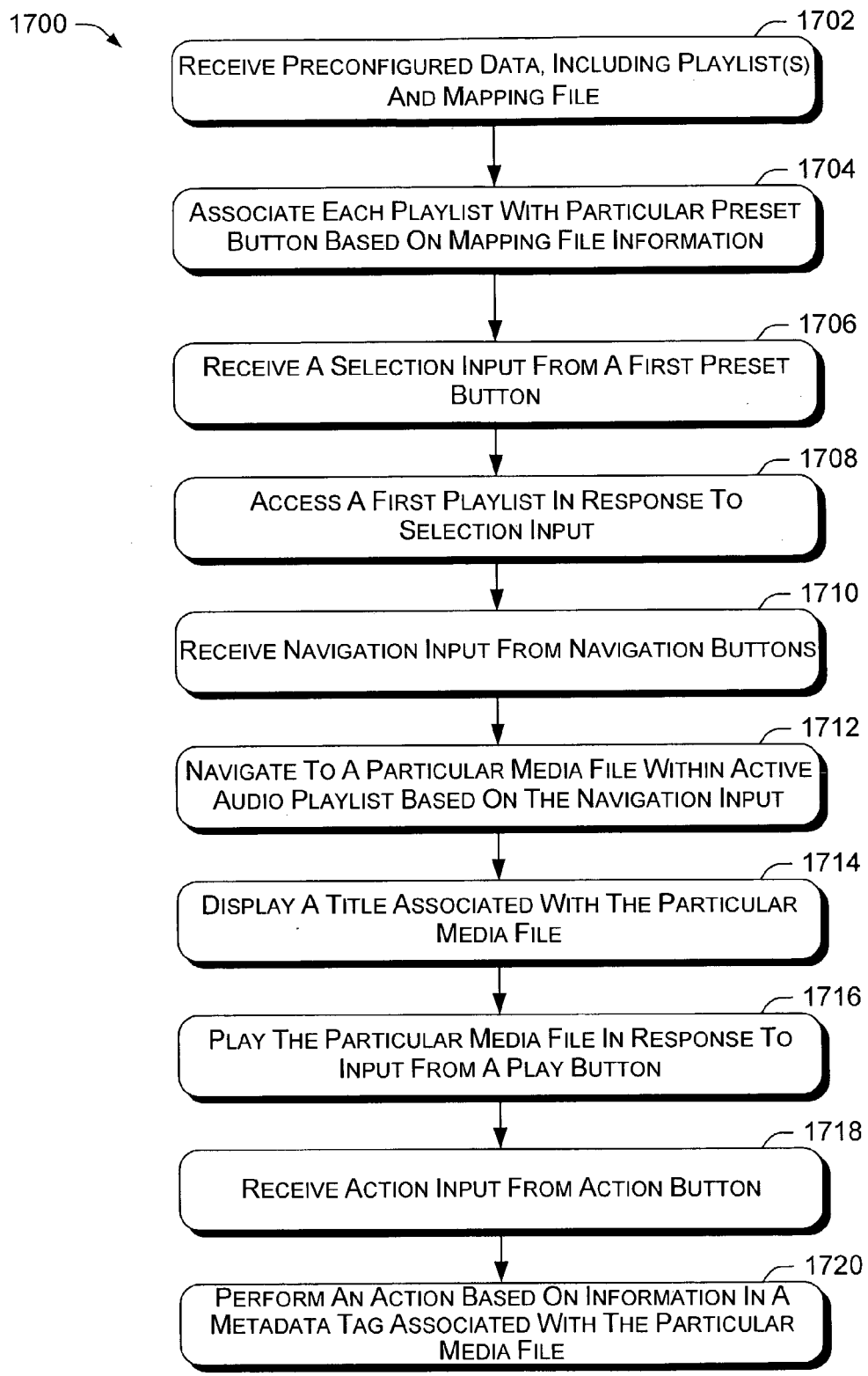
FIG. 17 is a flow diagram illustrating an exemplary method of playing media content on a media player.

FIG. 17 shows an exemplary method 1700 of playing media content on a media player 102. The method applies generally to the exemplary embodiments discussed above with respect to FIGS. 13–16. The elements of the described method may be performed by any appropriate means including, for example, by the execution of processor-readable instructions defined on a processor-readable media, such as a disk, a ROM or other such memory device. In addition, while the method 1700 is disclosed by means of a flow diagram and text associated with the blocks of the flow diagram, it is to be understood that the blocks do not necessarily have to be performed in the order in which they are presented, and that an alternative order may result in similar advantages.

At block 1702, a media player 102 receives preconfigured content in the form of playlists 220, 222, and a mapping file 234 from a computer 106. At block 1704, playlists are mapped to particular presets on the media player 102 according to information in the mapping file 234. At block 1706, a selection input is received from a first preset button.

The selection input represents a user's desire to access media content corresponding to the playlist that is associated with the first preset button. At block 1708, a first playlist is accessed based on the selection input from the first preset button. Thus, the first playlist is made active. When a playlist is accessed, a title appears on the media player display panel 1316 representing whichever media file is current in the playlist at that time. For example, if the playlist for the first preset was last accessed while media file number 23 was playing, then the title to media file number 23 will appear on the display panel 1316 when the playlist for the first preset is accessed the next time.

Continuing at block 1710, navigation input is received from navigation buttons. The navigation input represents a user's desire to navigate among media files within the currently active playlist associated with the first preset button. At block 1712, the media player 102 navigates to a particular media file within the active playlist according to the user's navigation input. At block 1714, a title associated with the particular media file is displayed on a display panel of the media player. At block 1716, the particular media file is played by the media player in response to input from a play button on the common user interface 1312. At block 1718, action input is receive from an action button on the media player 102. The action input represents a user's desire to have the media player 102 perform an innate function of the media player using information stored in a metadata tag 230 that is related to the current media file. At block 1720, the media player 102 performs an action based on information in a metadata tag 230 that is associated with the particular media file. An example includes the media player, implemented as a cell phone, accessing and dialing a telephone number stored in the metadata tag 230 automatically when the action button is selected by a user.

Exemplary Computer

Figure 18:
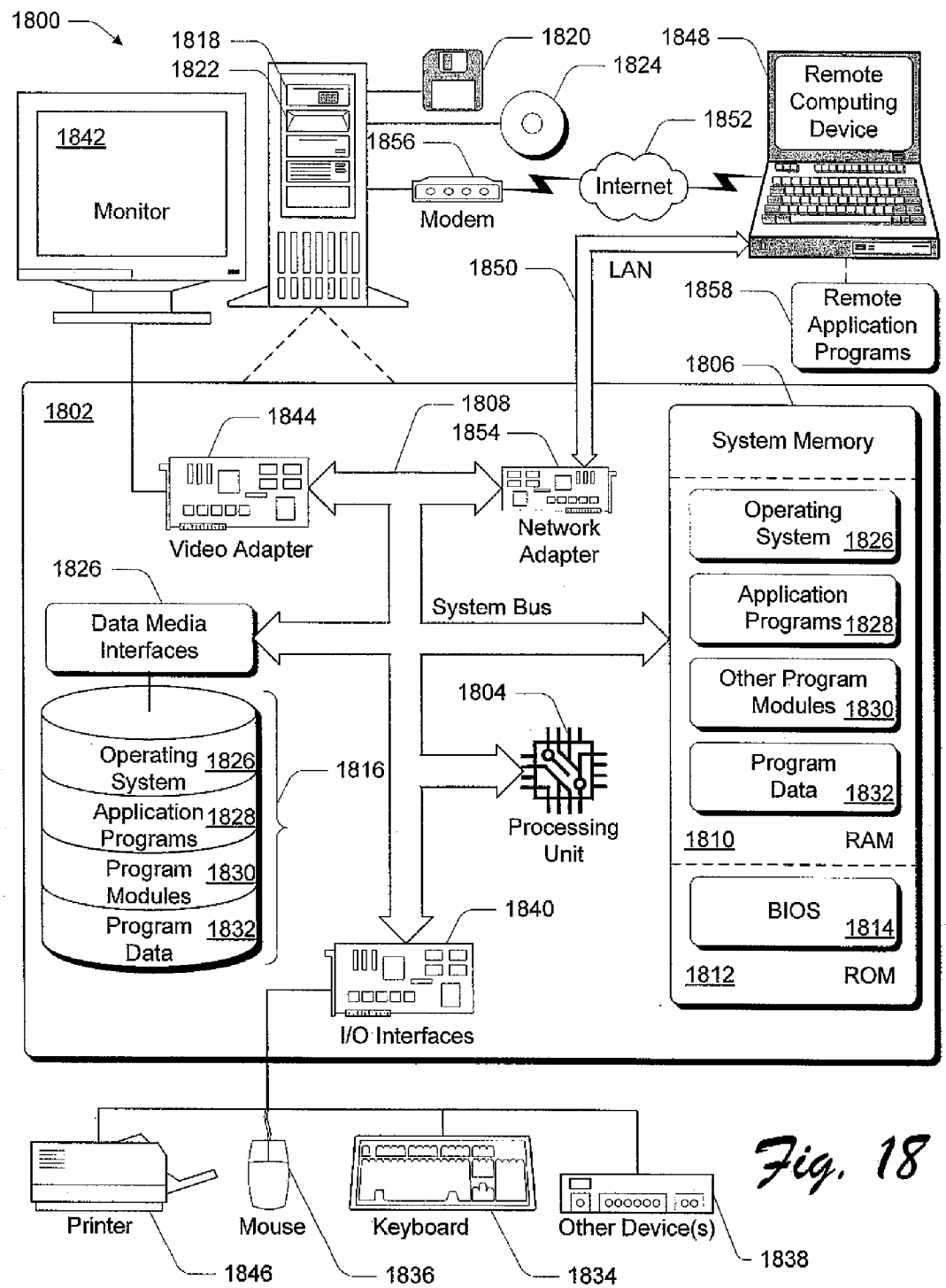
FIG. 18 illustrates an exemplary computing environment that is suitable for implementing a general-purpose computer.

FIG. 18 illustrates an example of a suitable computing environment 1800 that may be used to implement the general-purpose computer 106. Although one specific configuration is shown, computer 106 may be implemented in other computing configurations.

The computing environment 1800 includes a general-purpose computing system in the form of a computer 1802. The components of computer 1802 can include, but are not limited to, one or more processors or processing units 1804, a system memory 1806, and a system bus 1808 that couples various system components including the processor 1804 to the system memory 1806.

The system bus 1808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1802 typically includes a variety of computer readable media. Such media can be any available media that is accessible by computer 1802 and includes both volatile and non-volatile media, removable and non-removable media. The system memory 1806 includes computer readable media in the form of volatile memory, such as random access memory (RAM) 1810, and/or non-volatile memory, such as read only memory (ROM) 1812. A basic input/output system (BIOS) 1814, containing the basic routines that help to transfer information between elements within computer 1802, such as during start-up, is stored in ROM 1812. RAM 1810 typically contains data and/or program modules that are immediately accessible to and/or presently operated on by the processing unit 1804.

Computer 1802 can also include other removable/non-removable, volatile/non-volatile computer storage media. By way of example, FIG. 18 illustrates a hard disk drive 1816 for reading from and writing to a non-removable, non-volatile magnetic media (not shown), a magnetic disk drive 1818 for reading from and writing to a removable, non-volatile magnetic disk 1820 (e.g., a "floppy disk"), and an optical disk drive 1822 for reading from and/or writing to a removable, non-volatile optical disk 1824 such as a CD-ROM, DVD-ROM, or other optical media. The hard disk drive 1816, magnetic disk drive 1818, and optical disk drive 1822 are each connected to the system bus 1808 by one or more data media interfaces 1826. Alternatively, the hard disk drive 1816, magnetic disk drive 1818, and optical disk drive 1822 can be connected to the system bus 1808 by a SCSI interface (not shown).

The disk drives and their associated computer-readable media provide non-volatile storage of computer readable instructions, data structures, program modules, and other data for computer 1802. Although the example illustrates a hard disk 1816, a removable magnetic disk 1820, and a removable optical disk 1824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1816, magnetic disk 1820, optical disk 1824, ROM 1812, and/or RAM 1810, including by way of example, an operating system 1826, one or more application programs 1828, other program modules 1830, and program data 1832. Each of such operating system 1826, one or more application programs 1828, other program modules 1830, and program data 1832 (or some combination thereof) may include an embodiment of a caching scheme for user network access information.

A user can enter commands and information into computer system 1802 via input devices such as a keyboard 1834 and a pointing device 1836 (e.g., a "mouse"). Other input devices 1838 (not shown specifically) may include a microphone, joystick, game pad, satellite dish, serial port, scanner, and/or the like. These and other input devices are connected to the processing unit 1804 via input/output interfaces 1840 that are coupled to the system bus 1808, but may be connected by other interface and bus structures, such as a parallel port, game port, or a universal serial bus (USB).

A monitor 1842 or other type of display device can also be connected to the system bus 1808 via an interface, such as a video adapter 1844. In addition to the monitor 1842, other output peripheral devices can include components such as speakers (not shown) and a printer 1846 which can be connected to computer 1802 via the input/output interfaces 1840.

Computer 1802 can operate in a networked environment using logical connections to one or more remote computers, such as a remote computing device 1848. By way of example, the remote computing device 1848 can be a personal computer, portable computer, a server, a router, a network computer, a peer device or other common network node, and the like. The remote computing device 1848 illustrated as a portable computer that can include many or all of the elements and features described herein relative to computer system 1802.

Logical connections between computer 1802 and the remote computer 1848 are depicted as a local area network (LAN) 1850 and a general wide area network (WAN) 1852. Such networking environments are commonplace in offices, enterprise-wide computer networks, intranets, and the Internet. When implemented in a LAN networking environment, the computer 1802 is connected to a local network 1850 via a network interface or adapter 1854. When implemented in a WAN networking environment, the computer 1802 typically includes a modem 1856 or other means for establishing communications over the wide network 1852. The modem 1856, which can be internal or external to computer 1802, can be connected to the system bus 1808 via the input/output interfaces 1840 or other appropriate mechanisms. It is to be appreciated that the illustrated network connections are exemplary and that other means of establishing communication link(s) between the computers 1802 and 1848 can be employed.

In a networked environment, such as that illustrated with computing environment 1800, program modules depicted relative to the computer 1802, or portions thereof, may be stored in a remote memory storage device. By way of example, remote application programs 1858 reside on a memory device of remote computer 1848. For purposes of illustration, application programs and other executable program components, such as the operating system, are illustrated herein as discrete blocks, although it is recognized that such programs and components reside at various times in different storage components of the computer system 1802, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A data formatting system comprising:
    a content retriever to retrieve and format data;
    a media file playlist generated by the content retriever from the data, the media file playlist including a playlist entry title identifying a title for a media file, a filename identifying the media file, and a metadata tag containing data for performing an action associated with the media file;
    a text file playlist generated by the content retriever from the text data, formatted in XML (extensible markup language), and includes:
        text-to-speech markup tags identifying the XML-formatted text file as a text-to-speech conversion file;
        playlist name markup tags within the text-to-speech markup tags identifying a playlist type and a playlist title;
        entry title markup tags within the playlist name markup tags identifying a playlist entry title;
        text filename markup tags within the entry title markup tags identifying a text segment and a text filename for the text segment; and
        action markup tags within the entry title markup tags identifying data for performing an action associated with the text segment;
    a text-to-speech converter configured to generate at least one audio file playlist from the text file playlist; and
    a configuration module associated with the content retriever configured to accept user input instructions that identify the data.

2. A data formatting system as recited in claim 1, wherein the audio file playlist further comprises:
    a playlist entry title identifying a title for an audio file;
    a filename identifying the audio file; and
    a metadata tag containing data for performing an action associated with the audio file.

3. A data formatting system as recited in claim 1, wherein the media file playlist includes the media file and wherein media files are selected from the group comprising:
    audio files;
    video files;
    audio/video files; and
    image files.

4. A data formatting system as recited in claim 1, further comprising a content source, wherein the user input instructions identify the content source.

5. A data formatting system as recited in claim 4, wherein the content source is selected from the group comprising:
    a computer comprising the content retriever, the media file playlist, and the configuration module; and
    a network computer coupled to the computer via a network.

6. A data formatting system comprising:
    a content retriever to retrieve data and to generate a text file playlist from the data, wherein the text file playlist comprises an XML (extensible markup language)-formatted text file that includes:
        text-to-speech markup tags identifying the XML-formatted text file as a text-to-speech conversion file;
        playlist name markup tags within the text-to-speech markup tags identifying a playlist type and a playlist title;
        entry title markup tags within the playlist name markup tags identifying a playlist entry title;
        text filename markup tags within the entry title markup tags identifying a text segment and a text filename for the text segment; and
        action markup tags within the entry title markup tags identifying data for performing an action associated with the text segment;
    a configuration module associated with the content retriever to accept user input instructions that identify the data; and
    a text-to-speech converter to generate one or more audio file playlists from the text file playlist.

7. A data formatting system as recited in claim 6, wherein each audio file playlist further comprises:
    a playlist entry title identifying a title for an audio file;
    a filename identifying the audio file; and
    a metadata tag containing data for performing an action associated with the audio file.

8. A data formatting system as recited in claim 6, further comprising a content source, wherein the user input instructions identify the content source.

9. A data formatting system as recited in claim 8, wherein the content source is selected from the group comprising:
    a computer that comprises the data formatting system; and
    a network computer coupled to the computer via a network.

10. A data formatting system as recited in claim 6, wherein the content retriever is a plurality of content retrievers, the configuration module is a plurality of configuration modules, and each configuration module is associated with a particular content retriever.

11. A data formatting system as recited in claim 10, wherein each content retriever is configured to retrieve and format data from a specific data set.

12. A data formatting system as recited in claim 11, wherein the specific data set is selected from the group comprising:
calendar data
task data;
contact data;
email data;
stock data;
voice mail data;
navigation data;
news data;
weather data;
sports data;
traffic data;
real time instant message data;
restaurant review data;
movie listings data;
trivia data;
document data; and
user instructional data.

13. A processor-readable medium comprising processor-executable instructions configured for:
retrieving data from a content source;
generating a text file playlist from the data, wherein the text file playlist comprises an XML (extensible markup language)-formatted text file that includes:
text-to-speech markup tags identifying the XML-formatted text file as a text-to-speech conversion file;
playlist name markup tags within the text-to-speech markup tags identifying a playlist type and a playlist title;
entry title markup tags within the playlist name markup tags identifying a playlist entry title;
text filename markup tags within the entry title markup tags identifying a text segment and a text filename for the text segment; and
action markup tags within the entry title markup tags identifying data for performing an action associated with the text segment;
converting text segments from the text file playlist into audio files; and generating an audio file playlist that includes the audio files.

14. A processor-readable medium as recited in claim 13, comprising further processor-executable instructions configured for receiving instructions that identify the data and the content source.

15. A processor-readable medium as recited in claim 14, wherein the receiving further comprises presenting an interactive user interface on a computer screen through which a user can identify the data and the content source.

16. A processor-readable medium as recited in claim 13, wherein the content source is selected from the group comprising:
a computer that comprises the processor-readable medium; and
a network computer coupled to the computer via a network.

17. A processor-readable medium comprising processor-executable instructions configured for:
retrieving data from a content source; and
generating a text file playlist from the data, wherein the text file playlist comprises an XML (extensible markup language)-formatted text file that includes:
text-to-speech markup tags identifying the XML-formatted text file as a text-to-speech conversion file;
playlist name markup tags within the text-to-speech markup tags identifying a playlist type and a playlist title;
entry title markup tags within the playlist name markup tags identifying a playlist entry title;
text filename markup tags within the entry title markup tags identifying a text segment and a text filename for the text segment; and
action markup tags within the entry title markup tags identifying data for performing an action associated with the text segment.

18. A processor-readable medium as recited in claim 17, wherein the media file is an audio file and the generating further comprises:
generating a text file playlist from the data;
converting a text segment from the text file playlist into the audio file; and
generating the media file playlist from the text file playlist and the audio file.

19. A processor-readable medium as recited in claim 17, comprising further processor-executable instructions configured for receiving instructions that identify the data and the content source.

20. A processor-readable medium as recited in claim 19, wherein the receiving further comprises presenting an interactive user interface on a computer screen though which a user can identify the data and the content source.

21. A processor-readable medium as recited in claim 17, wherein the content source is selected from the group comprising:
a computer that comprises the processor-readable medium; and
a network computer coupled to the computer via a network.

22. A method of preparing data comprising:
retrieving data from a content source;
generating a text file playlist from the data, wherein the text file playlist comprises an XML (extensible markup language)-formatted text file that includes:
text-to-speech markup tags identifying the XML-formatted text file as a text-to-speech conversion file;
playlist name markup tags within the text-to-speech markup tags identifying a playlist type and a playlist title;
entry title markup tags within the playlist name markup tags identifying a playlist entry title;
text filename markup tags within the entry title markup tags identifying a text segment and a text filename for the text segment; and
action markup tags within the entry title markup tags identifying data for performing an action associated with the text segment;
converting text segments from the text file playlist into audio files; and
generating an audio file playlist that includes the audio files.

23. A method as recited in claim 22, further comprising receiving instructions that identify the data and the content source.

24. A method as recited in claim 23, wherein the receiving further comprises presenting an interactive user interface on a computer screen through which a user can identify the data and the content source.

25. A method of preparing data comprising:
retrieving data from a content source; and
generating a text file playlist from the data, wherein the text file playlist comprises an XML (extensible markup language)-formatted text file that includes:
text-to-speech markup tags identifying the XML-formatted text file as a text-to-speech conversion file;
playlist name markup tags within the text-to-speech markup tags identifying a playlist type and a playlist title;
entry title markup tags within the playlist name markup tags identifying a playlist entry title;
text filename markup tags within the entry title markup tags identifying a text segment and a text filename for the text segment; and
action markup tags within the entry title markup tags identifying data for performing an action associated with the text segment.

26. A method as recited in claim 25, wherein the media file is an audio file and the generating further comprises:
generating a text file playlist from the data;
converting a text segment from the text file playlist into the audio file; and
generating the media file playlist from the text file playlist and the audio file.

* * * * *

UNITED STATES PATENT AND TRADEMARK OFFICE
CERTIFICATE OF CORRECTION

PATENT NO. : 7,159,174 B2  
APPLICATION NO. : 10/317527  
DATED : January 2, 2007  
INVENTOR(S) : Bruce Alan Johnson et al.

Page 1 of 1

It is certified that error appears in the above-identified patent and that said Letters Patent is hereby corrected as shown below:

Title Page on page 2, Item (56), under "U.S. Patent Documents", in column 1, line 13, delete "Quereshey et al." and insert -- Qureshey et al. --, therefor.

Title Page on page 2, Item (56), under "Other Publications", in column 2, line 14, delete "Trasactions" and insert -- Transactions --, therefor.

In column 9, line 9, delete "14, Oct." and insert -- 14 Oct. --, therefor.

In column 15, line 35, before "Museum" delete "Top" and insert -- To --, therefor.

In column 15, line 40, before "Preset" insert -- < --.

In column 15, line 43, before "Preset" insert -- < --.

In column 15, line 49, before "Preset" insert -- < --.

In column 18, line 13, delete "completeted." and insert -- completed. --, therefor.

In column 18, line 14, delete "progess," and insert -- progress, --, therefor.

In column 21, line 2, after "1848" insert -- is --.

In column 23, line 12, in Claim 12, after "data" insert -- ; --.

In column 24, line 33, in Claim 20, delete "though" and insert -- through --, therefor.

Signed and Sealed this

Twenty-seventh Day of July, 2010

David J. Kappos  
*Director of the United States Patent and Trademark Office*